(12) United States Patent
Wang et al.

(10) Patent No.: US 10,924,268 B2
(45) Date of Patent: Feb. 16, 2021

(54) KEY DISTRIBUTION METHOD, AND RELATED DEVICE AND SYSTEM

(71) Applicant: HUAWEI TECHNOLOGIES CO., LTD., Shenzhen (CN)

(72) Inventors: Haiguang Wang, Singapore (SG); Yanjiang Yang, Shenzhen (CN); Xin Kang, Singapore (SG); Zhongding Lei, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 125 days.

(21) Appl. No.: 16/382,201

(22) Filed: Apr. 12, 2019

(65) Prior Publication Data

US 2019/0238322 A1 Aug. 1, 2019

Related U.S. Application Data

(63) Continuation of application No. PCT/CN2017/092945, filed on Jul. 14, 2017.

(30) Foreign Application Priority Data

Oct. 31, 2016 (CN) .......................... 2016 1 0930338

(51) Int. Cl.
*H04L 9/08* (2006.01)
*H04L 29/06* (2006.01)
(Continued)

(52) U.S. Cl.
CPC ................ *H04L 9/083* (2013.01); *H04L 9/08* (2013.01); *H04L 9/0827* (2013.01); *H04L 9/32* (2013.01);
(Continued)

(58) Field of Classification Search
CPC .......... G06F 21/31; G06F 21/45; G06F 21/41; H04L 63/06; H04L 63/061; H04L 63/0815; H04L 63/083
See application file for complete search history.

(56) References Cited

U.S. PATENT DOCUMENTS 9,420,007 B1 *  8/2016  Roth ...................... G06F 21/602
10,333,903 B1 *  6/2019  Campagna ............ H04L 63/061
(Continued)

FOREIGN PATENT DOCUMENTS

| CN | 101729493 A | 6/2010 |
| CN | 103220270 A | 7/2013 |

(Continued)

OTHER PUBLICATIONS

3GPP TS 22.185 V14.1.0 (Jun. 2016);3rd Generation Partnership Project;Technical Specification Group Services and System Aspects-;Service requirements for V2X services;Stage 1(Release 14), total 14 pages.

(Continued)

*Primary Examiner* — Gary S Gracia
(74) *Attorney, Agent, or Firm* — Kilpatrick Townsend & Stockton LLP

(57) ABSTRACT

A key distribution method is disclosed. In this method, a key request can be received by a key management system (KMS) from a mobile operator network element (MNO). The key request can carry a public key of UE. At least one PVT and one SSK can be allocated to the US based on an IBC ID. The at least one PVT and SSK can be encrypted based on the public key to generate ciphertext; and an object can be signed based on a preset digital signature private key (DSPK) to generate a digital signature. The object can include the public key and the ciphertext. Still, a signature validation public key associated with the DSPK can be determined and a key response can be returned to the MNO.

(Continued)

The key response can carry the signature validation public key, the public key of the UE, the ciphertext, and the digital signature.

10 Claims, 16 Drawing Sheets

(51) Int. Cl.
*H04L 9/32* (2006.01)
*H04W 12/04* (2021.01)
*H04L 9/00* (2006.01)
*H04W 4/40* (2018.01)

(52) U.S. Cl.
CPC .......... *H04L 9/3247* (2013.01); *H04L 9/3263* (2013.01); *H04L 29/06* (2013.01); *H04L 63/0442* (2013.01); *H04L 63/0807* (2013.01); *H04L 63/0823* (2013.01); *H04L 63/126* (2013.01); *H04W 12/04031* (2019.01); *H04L 63/0428* (2013.01); *H04W 4/40* (2018.02)

(56) References Cited

U.S. PATENT DOCUMENTS

| | | | | |
|---|---|---|---|---|
| 2003/0115466 | A1* | 6/2003 | Aull | H04L 9/3268 713/172 |
| 2005/0188202 | A1* | 8/2005 | Popp | H04L 9/3263 713/175 |
| 2008/0052521 | A1* | 2/2008 | Gentry | H04L 9/3247 713/180 |
| 2011/0211699 | A1* | 9/2011 | Ma | H04L 9/0877 380/278 |
| 2015/0235011 | A1* | 8/2015 | Swaminathan | H04L 65/608 713/171 |
| 2015/0269570 | A1* | 9/2015 | Phan | G06Q 20/382 705/71 |
| 2015/0326302 | A1* | 11/2015 | Stojanovski | H04W 12/02 370/315 |
| 2015/0326572 | A1* | 11/2015 | Oyman | H04L 65/60 726/4 |
| 2015/0373048 | A1* | 12/2015 | Siddiqui | H04L 67/125 713/151 |
| 2016/0021529 | A1 | 1/2016 | Park et al. | |
| 2016/0028548 | A1* | 1/2016 | Yao | H04L 63/062 713/176 |
| 2016/0212108 | A1* | 7/2016 | Stojanovski | H04W 12/0401 |
| 2016/0259936 | A1* | 9/2016 | Mukherjee | G06F 21/41 |
| 2016/0269185 | A1* | 9/2016 | Stojanovski | H04W 8/005 |
| 2016/0286395 | A1* | 9/2016 | Adrangi | H04L 9/3252 |
| 2016/0344726 | A1* | 11/2016 | Stojanovski | H04L 9/3247 |

FOREIGN PATENT DOCUMENTS

| | | |
|---|---|---|
| CN | 103442004 A | 12/2013 |
| CN | 103490901 A | 1/2014 |
| CN | 103782568 A | 5/2014 |
| CN | 103974250 A | 8/2014 |
| CN | 104304000 A | 3/2015 |
| CN | 104427496 A | 3/2015 |
| CN | 105282732 A | 1/2016 |

OTHER PUBLICATIONS

3GPP TR 22.885 V14.0.0 (Dec. 2015);3rd Generation Partnership Project;Technical Specification Group Services and System Aspects;Study on LTE support for Vehicle to Everything (V2X) services(Release 14), total 50 pages.

3GPP TR 33.885 V0.4.0 (Jul. 2016);3rd Generation Partnership Project;Technical Specification Group Services and System Aspects;Study on Security Aspect for LTE support of V2X Services (Release 14), total 62 pages.

* cited by examiner

KEY DISTRIBUTION METHOD, AND RELATED DEVICE AND SYSTEM

CROSS-REFERENCE TO RELATED APPLICATIONS

This application is a continuation of International Application No. PCT/CN2017/092945, filed on Jul. 14, 2017, which claims priority to a continuation of Chinese Application No. 201610930338.6, filed on Oct. 31, 2016. The disclosures of the aforementioned applications are hereby incorporated by reference in their entireties.

TECHNICAL FIELD

The present invention relates to the Internet of Vehicles field, and in particular, to a key distribution method and a related device and system.

BACKGROUND

An Internet of Vehicles technology is a technology for implementing information exchange between vehicles, between a vehicle and a pedestrian, and between a vehicle and roadside equipment by broadcasting a message on a specified radio channel. To ensure authenticity of a message, it is required that a signature be carried when a vehicle broadcasts a message, so that a message receiver confirms, based on the message signature, that the message is sent by an authorized user. In a current LTE-V (Long Term Evolution Vehicle, Long Term Evolution for Vehicle, LTE-V for short) technology, based on an existing LTE network, in-vehicle terminals communicate with each other through a PC5 interface. To ensure authenticity of a message sent by UE (User Equipment, user equipment) in an LTE-V-based Internet of Vehicles system, a KMS (Key Management System, key management system, KMS for short) needs to distribute a PVT (Public Validation Token, public validation token, PVT for short) and an SSK (Secret Signing Key, secret signing key) to the UE. The UE signs the message based on the allocated PVT and SSK. A process of allocating, by the KMS, the SSK and the PVT to the UE is as follows: The UE sends a key request Key Request to a temporary ID management function (temporary identity management function, TIMF for short), where the key request carries a UE identity, a service identity, and V2X security capabilities of the UE. The temporary ID management function performs authentication and authorization. Then the temporary ID management function sends a key request Request SING-Key to the KMS. The KMS generates the communication keys SSK and PVT, and sends the communication keys SSK and PVT to the temporary ID management function. The temporary ID management function establishes association between the (UE ID, service ID) and the communication keys (SSK, PVT), and stores an association relationship in the temporary ID management function. The temporary ID management function sends the foregoing generated (SSK, PVT) to the UE.

The applicant finds that, in an existing LTE-V-based Internet of Vehicles architecture, the temporary ID management function may obtain the UE identity of a user based on the PVT, to track the user. However, the temporary ID management function is not a trusted agency. Therefore, security of the current SSK and PVT distribution process cannot be ensured.

SUMMARY

A technical problem that needs to be resolved by embodiments of the present invention is to provide a key obtaining method, a key processing method, a key distribution method, and a related device and system, so as to resolve a prior-art problem that an identity of a user is easily traced by an unauthorized party.

According to a first aspect, this application provides a key distribution system, where the key distribution system includes user equipment UE, a mobile operator network element MNO (Mobile Network Operator, mobile operator network element, MNO for short), and a KMS. The UE is an Internet of Vehicles terminal. The UE may communicate with the MNO by using an LTE-V protocol. A security connection is pre-established between the UE and the MNO. In addition, the UE may prestore an IBC (Identity Based Cryptography, identity-based cryptography, IBC for short) ID of the KMS and a public key of the KMS, or prestore a PKI (Public Key Infrastructure, public key infrastructure, PM for short)-based digital certificate and private key of the KMS of the UE. The MNO may be a TIMF (Temporary ID Management Function, temporary identity management function, TIMF for short) or a V2X control function (vehicle-to-vehicle control function) in an LTE-V-based Internet of Vehicles architecture, or a combination of the foregoing two network elements.

The UE generates a public key and a private key that have an association relationship, where the public key and the private key of the UE may be a PKI-based public key and private key. Identity information of the UE is determined, where the identity information of the UE represents a standard of a real identity of the UE. For example, the identity information of the UE may be an IMSI (International Mobile Subscriber Identification Number, international mobile subscriber identification number, IMSI for short), an MSISDN (Mobile Station Integrated Services Digital network Number, mobile station integrated services digital network number, MSISDN for short), or a digital certificate of the UE. The UE sends a first key request to the MNO through the established security connection. The first key request carries the public key of the UE, or the first key request further carries the identity information of the UE.

The MNO is configured to: receive the first key request, obtain the public key of the UE carried in the first key request, generate a second key request based on the public key of the UE, and send the second key request to the KMS, where the second key request carries the identity information of the UE. It should be noted that the second key request herein cannot carry the identity information of the UE. It should be noted that, when the MNO needs to obtain the identity information of the UE, the MNO may obtain the identity information of the UE carried in the first key request, or the MNO may obtain the identity information of the UE based on a connection context of the UE and the MNO.

The KMS is configured to: receive the second key request sent by the MNO; obtain the public key of the UE carried in the second key request; and allocate, to the UE, at least one PVT and one secret signing key SSK used for signing that are based on IBC, where a validity time is configured for each of the at least one PVT, and when a validity time of a PVT expires, the PVT becomes invalid. The KMS may randomly generate a character string of a specified length, and use the character string as one PVT. The KMS may generate the one SSK based on a global public key and a global private key of the IBC. The KMS signs a to-be-signed object based on a preset digital signature private key to obtain a digital signature; determines a signature validation public key associated with the digital signature private key; encrypts the at least one PVT and the one SSK based on the public key of the UE to obtain ciphertext; and sends, to the MNO, a key response carrying the signature validation public key, the public key of the UE, the digital signature, and the ciphertext, where the to-be-signed object includes the public key of the UE and the ciphertext.

The MNO is further configured to: receive the key response, and return the key response to the UE.

The UE is further configured to: receive the key response; obtain the signature validation public key, the public key of the UE, the digital signature, and the ciphertext that are carried in the key response; verify the digital signature based on the signature validation public key; and after the validation succeeds, decrypt the ciphertext based on the private key associated with the public key of the UE to obtain the at least one PVT and the one SSK, and store the at least one PVT and the one SSK. When the UE needs to communicate with another UE, the UE may encrypt a message by using the allocated one SSK, to ensure communication security. In the foregoing embodiment, when the KMS needs to allocate the PVT and the SSK to the UE, the KMS cannot learn about the identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace the real identity of the UE based on a signature generated by the UE by using the PVT and the SSK, thereby achieving high security.

In a possible implementation of this aspect, the MNO is further configured to obtain the identity information of the UE. The MNO may obtain the identity information of the UE from the first key request, or obtain the identity information of the UE by using the connection context when the UE establishes the connection to the MNO. This is not limited in this application. The MNO binds the public key of the UE to the identity information of the UE, and stores the public key of the UE and the identity information of the UE. The MNO stores a binding relationship between the public key of the UE and the identity information of the UE.

The KMS is further configured to: bind the public key of the UE to the at least one PVT, and store the public key of the UE and the at least one PVT. The KMS stores a binding relationship between the public key of the UE and the at least one PVT allocated to the UE.

In the foregoing embodiment, the identity information of the UE and a communication key of the UE are separately stored in two different network elements, implementing separation between an identity and the communication key. In a communication key allocation process, this can effectively avoid leakage of the communication key and leakage of the identity.

In a possible implementation of this aspect, the key distribution system further includes an MDM (Misbehavior Detection and Management, misbehavior detection and management network element, MDM for short). Security connections are pre-established between the MDM, and the KMS and the MNO. The MDM is an authorized trusted network element. For example, the MDM is an officially authorized network element.

The MDM is configured to send a first identity query request to the KMS, where the first identity query request carries the PVT of the UE. The PVT herein may be any one of the at least one PVT allocated by the KMS to the UE.

The KMS is further configured to: receive the first identity query request, obtain the PVT of the UE carried in the first identity query request, query for the public key of the UE associated with the PVT of the UE, and return, to the MDM, a first identity query response carrying the public key of the UE.

The MDM is further configured to: receive the first identity query response, obtain the public key of the UE carried in the first identity query response, generate a second identity query request based on the public key of the UE, and send the second identity query request to the MNO, where the second identity query request carries the public key of the UE.

The MNO is further configured to: receive the second identity query request, obtain the public key of the UE carried in the second identity query request, query for the identity information of the UE associated with the public key of the UE, and return, to the MDM, a second identity query response carrying the identity information of the UE.

The MDM receives the second identity query response, and obtains the identity information of the UE carried in the second identity query response.

In the foregoing embodiment, when the MDM needs to query for the real network identity of the UE corresponding to the PVT, the MDM needs to obtain the public key of the UE from the KMS, and then obtain the identity information of the UE from the MNO based on the obtained public key of the UE. This implements tracing of the real identity of the UE based on the anonymous PVT.

In a possible implementation of this aspect, the system further includes: a first key management network element and a second key management network element.

The MNO is further configured to obtain identity information of the UE. The MNO may obtain the identity information of the UE from information carried in the first key request, or obtain the identity information of the UE from the connection context when the UE establishes the connection to the MNO. The MNO sends a first storage request to the first key management network element, where the first storage request carries the public key of the UE and the identity information of the UE.

The first key management network element is configured to: receive the first storage request, obtain the public key of the UE and the identity information of the UE that are carried in the first storage request, bind the public key of the UE to the identity information of the UE, and store the public key of the UE and the identity information of the UE.

The KMS is further configured to send a second storage request to the second key management network element, where the second storage request carries the public key of the UE and the at least one PVT.

The second key management network element is configured to: receive the second storage request, obtain the public key of the UE and the at least one PVT that are carried in the second storage request, bind the public key of the UE to the at least one PVT, and store the public key of the UE and the at least one PVT.

In the foregoing embodiment, the identity information of the UE of the communication key of the UE are separately stored in two network elements independent of the MNO and the KMS, so that an authorized third party monitors the identity information and the communication key of the UE, and leakage of the real identity and the communication key of the UE is avoided.

In a possible implementation of this aspect, the system further includes an MDM.

The MDM is configured to send a first identity query request to a second key management network element, where the first identity query request carries the PVT of the UE.

The second key management network element is further configured to: receive the first identity query request, obtain the PVT of the UE carried in the first identity query request, query for the public key of the UE associated with the to-be-processed PVT, and return, to the MDM, a first identity query response carrying the public key of the UE.

The MDM is further configured to: receive the first identity query response, obtain the public key of the UE carried in the first identity query response, generate a second identity query request based on the public key of the UE, and send the second identity query request to a first key management network element, where the second identity query request carries the public key of the UE.

The first key management network element is further configured to: receive the second identity query request, obtain the public key of the UE carried in the second identity query request, query for the identity information of the UE associated with the public key of the UE, and return, to the MDM, a second identity query response carrying the identity information of the UE.

The MDM receives the second identity query response, and obtains the identity information of the UE carried in the second identity query response.

In the foregoing embodiment, when the MDM needs to query for the real network identity of the UE corresponding to the PVT, the MDM needs to obtain the public key of the UE from a network element associated with the KMS and independent of the KMS, and then obtain, based on the obtained public key of the UE, the identity information of the UE from a network element associated with the MNO and independent of the MNO. This implements tracing of the real identity of the UE based on the anonymous PVT.

In a possible implementation of this aspect, identity information of the UE includes an IMSI of the UE or a PM-based digital certificate of the UE.

In a possible implementation of this aspect, the preset digital signature private key is a private key corresponding to an IBC ID of the KMS, or a private key corresponding to a digital certificate of the KMS.

According to a second aspect, this application provides a key obtaining method, including:

pre-establishing, by UE, a security connection to an MNO; prestoring, by the UE, an IBS ID and a public key of a KMS, or prestoring a PM digital certificate and private key of the KMS; and generating, by the user equipment UE, a public key and a private key that have an association relationship;

sending, by the UE, a key request to the mobile operator network element MNO, where the key request carries the public key of the UE, or the key request may further carry identity information of the UE;

receiving, by the UE, a key response returned by the MNO, where the key response carries a signature validation public key, the public key of the UE, ciphertext, and a digital signature; and verifying, by the UE, the digital signature based on the signature validation public key; and after the validation succeeds, obtaining the private key associated with the public key of the UE, decrypting the ciphertext based on the private key of the UE to obtain at least one PVT and one secret signing key SSK used for signing that are based on identity-based cryptography IBC, and storing the at least one PVT and the one SSK.

In the foregoing embodiment, when requesting a communication key from the KMS through the MNO, the UE receives an encrypted communication key forwarded by the MNO. This avoids leaking the communication key to the MNO, and implements confidentiality of the communication key.

In a possible implementation of this aspect, the identity information of the UE includes an IMSI of the UE or a digital certificate of the UE.

In a possible implementation of this aspect, the digital validation public key is the IBC ID of the KMS, a PVT of the KMS, or the digital certificate of the KMS.

According to a third aspect, this application provides a key processing method, including:

first, receiving, by a mobile operator network element MNO, a first key request sent by user equipment UE, where the first key request carries a public key of the UE, or the first key request may further carry identity information of the UE;

then, obtaining, by the MNO, the public key of the UE and the identity information of the UE that are carried in the first key request;

generating, by the MNO, a second key request based on the public key of the UE, where the second key request carries the public key of the UE, and it should be noted that the second key request cannot in this case cannot carry the identity information of the UE, to avoid leaking the identity information of the UE to a KMS;

sending, by the MNO, the second key request to the KMS;

receiving, by the MNO, a key response returned by the KMS based on the second key request, where the key response carries a signature validation public key, the public key of the UE, ciphertext, and a digital signature; and forwarding, by the MNO, the key response to the UE.

In the foregoing embodiment, when the MNO sends a key request to the KMS based on a request of the UE, the key request carries the public key of the UE but does not carry the identity information of the UE. In this way, when allocating a communication key to the UE, the KMS cannot learn about a real identity of the UE, thereby implementing confidentiality of the real identity of the UE.

In a possible implementation of this aspect, the method further includes:

the first key request further carries the identity information of the UE, and the MNO obtains the identity information of the UE from the first key request, binds the public key of the UE to the identity information of the UE, and stores the public key of the UE and the identity information of the UE.

In a possible implementation of this aspect, the method further includes:

obtaining, by the MNO, the identity information of the UE, where the MNO may obtain the identity information of the UE from information carried in the first key request, or obtain the identity information of the UE from a connection context when the UE establishes a connection to the MNO; and sending, by the MNO, a storage request to an associated key management network element, where the storage request carries the public key of the UE and the identity information of the UE, and the storage request is used to instruct the key management network element to: bind the public key of the UE to the identity information of the UE, and store the public key of the UE and the identity information of the UE.

In a possible implementation of this aspect, the method further includes:

receiving, by the MNO, an identity query request sent by a misbehavior detection and management network element MDM, where the identity query request carries the public key of the UE;

querying, by the MNO, for the identity information of the UE associated with the public key of the UE; and returning, by the MNO, an identity query response to the MDM, where the identity query response carries the identity information of the UE.

According to a fourth aspect, this embodiment provides a key distribution method, including:

receiving, by a key management system KMS, a key request sent by a mobile operator network element MON, where the key request carries a public key of UE;

allocating, by the KMS to the UE, at least one PVT and one secret signing key SSK used for signing that are based on identity-based cryptography IBC;

encrypting, by the KMS, the at least one PVT and the one SSK based on the public key of the UE to generate ciphertext;

signing, by the KMS, a to-be-signed object based on a preset digital signature private key to generate a digital signature, where the to-be-signed object includes the public key of the UE and the ciphertext;

determining, by the KMS, a signature validation public key associated with the digital signature private key; and returning, by the KMS, a key response to the MON, where the key response carries a signature validation private key, the public key of the UE, the ciphertext, and the digital signature.

In a possible implementation of this aspect, the method further includes:

binding, by the KMS, the public key of the UE to the at least one PVT, and storing the public key of the UE and the at least one PVT.

In a possible implementation of this aspect, the method further includes:

sending, by the KMS, a storage request to an associated key management network element, where the storage request carries the public key of the UE and the at least one PVT, and the storage request is used to instruct the key management network element to: bind the public key of the UE to the at least one PVT, and store the public key of the UE and the at least one PVT.

In a possible implementation of this aspect, the method further includes:

receiving, by the KMS, an identity query request sent by an MDM, where the identity query request carries the PVT of the UE;

querying, by the KMS, for the public key of the UE associated with the PVT of the UE; and returning, by the KMS, an identity query response to the MDM, where the identity query response carries the public key of the UE.

In a possible implementation of this aspect, the preset digital signature private key is a private key corresponding to an IBC ID of the KMS, or a private key corresponding to a digital certificate of the KMS.

According to a fifth aspect, this application provides a user identity query method, including:

sending, by an MDM, a first identity query request to a second network element, where the first identity query request carries a PVT of UE;

receiving, by the MDM, a first identity query response returned by the second network element based on the first identity query request, where the first identity query response carries a public key associated with the PVT of the UE;

sending, by the MDM, a second identity query request to a first network element based on the public key of the UE;

receiving, by the MDM, a second identity query response returned by the second network element based on the second identity query request, where the second identity query response carries identity information of the UE; and receiving, by the MDM, the second identity query response, and obtaining the identity information of the UE.

In a possible implementation of this aspect, the first network element is a mobile operator network element MNO, and the second network element is a key management system KMS.

In a possible implementation of this aspect, the first network element is a network element associated with an MNO and independent of the MNO, and the second network element is a network element associated with a KMS and independent of the KMS.

According to a sixth aspect, this embodiment provides user equipment, including:

a generation module, configured to generate a public key and a private key that have an association relationship;

a sending module, configured to send a key request to a mobile operator network element MNO, where the key request carries the public key of the user equipment UE;

a receiving module, configured to receive a key response returned by the MNO, where the key response carries a signature validation public key, the public key of the UE, ciphertext, and a digital signature; and an obtaining module, configured to: verify the digital signature based on the signature validation public key; and after the validation succeeds, obtain the private key associated with the public key of the UE, decrypt the ciphertext based on the private key of the UE to obtain at least one PVT and one SSK based on identity-based cryptography IBC, and store the at least one PVT and the one SSK.

In the foregoing embodiment, when a KMS needs to allocate the PVT and the SSK to the UE, the KMS cannot learn about identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace a real identity of the UE, thereby achieving high security.

In a possible implementation of this aspect, identity information of the UE includes an IMSI of the UE or a digital certificate of the UE.

In a possible implementation of this aspect, the digital validation public key is an IBC ID of a KMS, a PVT of the KMS, or a digital certificate of the KMS.

According to a seventh aspect, this application provides a mobile operator network element, including:

a first receiving module, configured to receive a first key request sent by user equipment UE, where the first key request carries a public key of the UE, or the first key request may further carry identity information of the UE;

an obtaining module, configured to obtain the public key of the UE carried in the first key request;

a generation module, configured to generate a second key request based on the public key of the UE, where the second key request carries the public key of the UE;

a sending module, configured to send the second key request to a KMS;

a second receiving module, configured to receive a key response returned by the KMS based on the second key request, where the key response carries a signature validation public key, the public key of the UE, ciphertext, and a digital signature; and a forwarding module, configured to forward the key response to the UE.

In the foregoing embodiment, when the KMS needs to allocate a PVT and an SSK to the UE, the KMS cannot learn about the identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace a real identity of the UE by using the PVT included in a message, thereby achieving high security.

In a possible implementation of this aspect, the first key request further carries the identity information of the UE, and the network element further includes:

a binding module, configured to: obtain the identity information of the UE carried in the first key request, bind the public key of the UE to the identity information of the UE, and store the public key of the UE and the identity information of the UE.

In a possible implementation of this aspect, the network element further includes:

a binding indication module, configured to: obtain the identity information of the UE, and send a storage request to an associated key management network element, where the storage request carries the public key of the UE and the identity information of the UE, and the storage request is used to instruct the key management network element to: bind the public key of the UE to the identity information of the UE, and store the public key of the UE and the identity information of the UE.

In a possible implementation of this aspect, the network element further includes:

a third receiving module, configured to receive an identity query request sent by a misbehavior detection and management network element MDM, where the identity query request carries the public key of the UE;

a query module, configured to query for the identity information of the UE associated with the public key of the UE; and a response module, configured to return an identity query response to the MDM, where the identity query response carries the identity information of the UE.

According to an eighth aspect, this application provides a key management system, including:

a first receiving module, configured to receive a key request sent by a mobile operator network element MON, where the key request carries a public key of UE;

an allocation module, configured to allocate, to the UE, at least one PVT and one secret signing key SSK used for signing that are based on identity-based cryptography IBC;

an encryption module, configured to encrypt the at least one PVT and the one SSK based on the public key of the UE to generate ciphertext;

a signature module, configured to sign a to-be-signed object based on a preset digital signature private key to generate a digital signature, where the to-be-signed object includes the public key of the UE and the ciphertext;

a determining module, configured to determine a signature validation public key associated with the digital signature private key; and a response module, configured to return a key response to the MON, where the key response carries the signature validation private key, the public key of the UE, the ciphertext, and the digital signature.

In the foregoing embodiment, when the KMS needs to allocate the PVT and the SSK to the UE, the KMS cannot learn about identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace a real identity of the UE based on the PVT carried in a received Internet of Vehicles message, thereby achieving high security.

In a possible implementation of this aspect, the system further includes:

a binding module, configured to: bind the public key of the UE to the at least one PVT, and store the public key of the UE and the at least one PVT.

In a possible implementation of this aspect, the system further includes:

a binding indication module, configured to send a storage request to an associated key management network element, where the storage request carries the public key of the UE and the at least one PVT, and the storage request is used to instruct the key management network element to: bind the public key of the UE to the at least one PVT, and store the public key of the UE and the at least one PVT.

In a possible implementation of this aspect, the system further includes:

a second receiving module, configured to receive an identity query request sent by an MDM, where the identity query request carries the PVT of the UE;

a query module, configured to query for the public key of the UE associated with the PVT of the UE; and a response module, configured to return an identity query response to the MDM, where the identity query response carries the public key of the UE.

In a possible implementation of this aspect, the preset digital signature private key is a private key corresponding to an IBC ID of the KMS, or a private key corresponding to a digital certificate of the KMS.

According to a ninth aspect, this application provides a misbehavior detection and management network element, including:

a first sending module, configured to send a first identity query request to a second network element, where the first identity query request carries a PVT of UE;

a first receiving module, configured to receive a first identity query response returned by the second network element based on the first identity query request, where the first identity query response carries a public key associated with the PVT of the UE;

a second sending module, configured to send a second identity query request to a first network element based on the public key of the UE;

a second receiving module, configured to receive a second identity query response returned by the second network element based on the second identity query request, where the second identity query response carries identity information of the UE; and an obtaining module, configured to: receive the second identity query response, and obtain the identity information of the UE.

In the foregoing embodiment, when the MDM needs to query for a real network identity of the UE corresponding to the PVT, the MDM needs to obtain the public key of the UE from a KMS or the second network element, and then obtain the identity information of the UE from an MNO or the first network element based on the obtained public key of the UE. This implements tracing of the real identity of the UE based on the anonymous PVT.

In a possible implementation of this aspect, the first network element is a mobile operator network element MNO, and the second network element is a key management system KMS.

In a possible implementation of this aspect, the first network element is a network element associated with an MNO and independent of the MNO, and the second network element is a network element associated with a KMS and independent of the KMS.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1A:
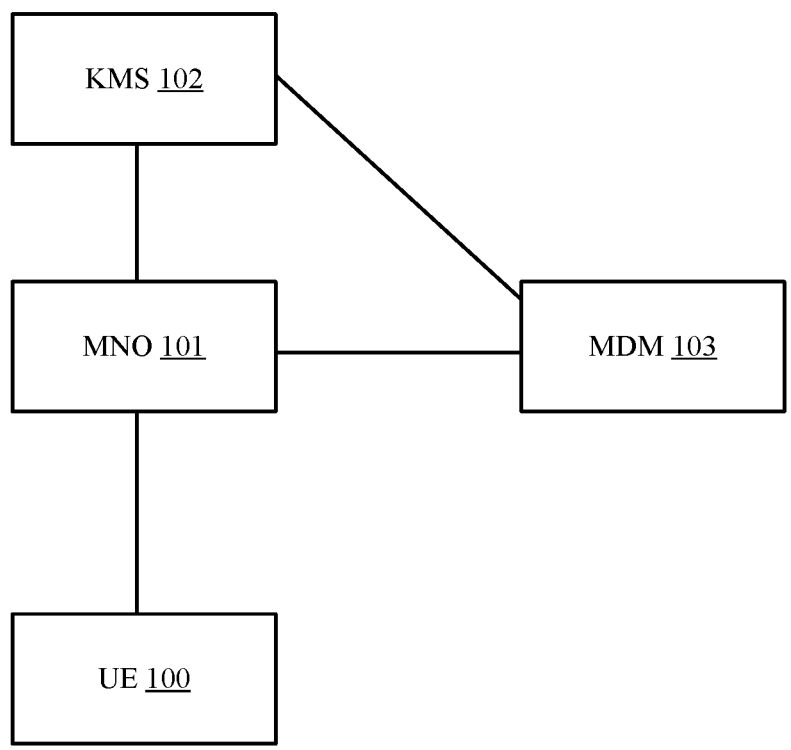
FIG. 1a is a schematic structural diagram of a key distribution system according to an embodiment of the present invention.

FIG. 1a is a schematic structural diagram of a key distribution system according to an embodiment of the present invention. In this embodiment of the present invention, the key distribution system includes: UE (User Equipment, user equipment, UE for short) 100, an MNO (Mobile Network Operator, mobile operator network element, MNO for short) 101, a KMS (Key Management System, key management system, KMS for short) 102, and an MDM (Misbehavior Detection and Management, misbehavior detection and management network element) 103. Main functions of the devices in the key distribution system are as follows:

The UE 100 is configured to: generate a public key and a private key that have an association relationship, determine identity information of the UE, and send a first key request to the MNO 101. The first key request carries the public key of the UE, or the first key request may further carry the identity information of the UE. The generated public key and private key may be PM-based keys. The identity information of the UE indicates a real identity of the UE, and includes but is not limited to an IMSI, an MSISDN, or a digital certificate of the UE.

The MNO 101 is configured to: receive the first key request, obtain the public key of the UE carried in the first key request, generate a second key request based on the public key of the UE, and send the second key request to the KMS 102. The second key request carries the public key of the UE, and the second key request does not carry the identity information of the UE. Therefore, the KMS cannot learn about the real identity of the UE.

The KMS 102 is configured to: receive the second key request; obtain the public key of the UE carried in the second key request; allocate, to the UE, at least one public validation token PVT and one secret signing key SSK used for signing that are based on identity-based cryptography IBC; sign a to-be-signed object based on a preset digital signature private key to obtain a digital signature; determine a signature validation public key associated with the digital signature private key; encrypt the at least one PVT and the one SSK based on the public key of the UE to obtain ciphertext; and send, to the MNO 101, a key response carrying the signature validation public key, the public key of the UE, the digital signature, and the ciphertext. The to-be-signed object includes the public key of the UE and the ciphertext.

The MNO 101 is further configured to: receive the key response, and return the key response to the UE.

The UE 100 is further configured to: receive the key response; obtain the signature validation public key, the public key of the UE 100, the digital signature, and the ciphertext that are carried in the key response; verify the digital signature based on the signature validation public key; and after the validation succeeds, decrypt the ciphertext based on the private key associated with the public key of the UE 100 to obtain the at least one PVT and the one SSK, and store the at least one PVT and the one SSK. When the UE 100 needs to communicate with another UE, the UE 100 may encrypt a message by using the allocated at least one PVT and one SSK.

Optionally, the MNO 101 is further configured to: bind the public key of the UE 100 to the identity information of the UE 100, and store the public key of the UE 100 and the identity information of the UE 100.

The KMS 102 is further configured to: bind the public key of the UE 100 to the at least one PVT, and store the public key of the UE 100 and the at least one PVT.

Optionally, the system further includes a misbehavior detection and management network element (MDM) 103.

The MDM 103 is configured to send a first identity query request to the KMS 102, where the first identity query request carries the PVT of the UE 100.

The KMS 102 is further configured to: receive the first identity query request, obtain the PVT of the UE 100 carried in the first identity query request, query for the public key of the UE 100 associated with the PVT of the UE 100, and return, to the MDM, a first identity query response carrying the public key of the UE 100.

The MDM 103 is further configured to: receive the first identity query response, obtain the public key of the UE carried in the first identity query response, generate a second identity query request based on the public key of the UE 100, and send the second identity query request to the MNO 101, where the second identity query request carries the public key of the UE 100.

The MNO 101 is further configured to: receive the second identity query request, obtain the public key of the UE carried in the second identity query request, query for the identity information of the UE 100 associated with the public key of the UE 100, and return, to the MDM 103, a second identity query response carrying the identity information of the UE 100.

The MDM 103 receives the second identity query response, and obtains the identity information of the UE 100 carried in the second identity query response.

In the foregoing embodiment, when the KMS needs to allocate the PVT and the SSK to the UE, the KMS cannot learn about the identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace the real identity of the UE based on the PVT included in a message, thereby achieving high security.

Figure 1B:
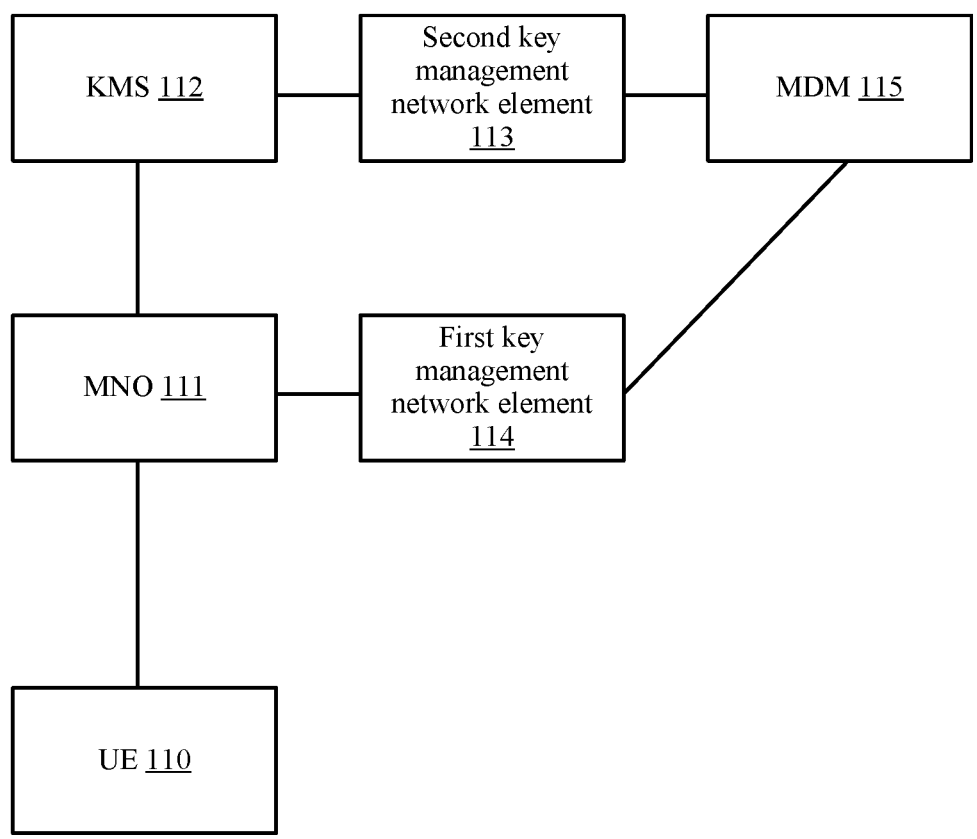
FIG. 1b is another schematic structural diagram of a key distribution system according to an embodiment of the present invention.

FIG. 1*b* is another schematic structural diagram of a key distribution system according to an embodiment of the present invention. In this embodiment, the key distribution system includes: UE 110, an MNO 111, a KMS 112, a first key management network element 114, a second key management network element 113, and an MDM 115. A difference between a structure in FIG. 1*b* and the structure in FIG. 1*a* merely lies in that the first key management network element 114 and the second key management network element 113 are added. The first key management network element 114 is configured to store a public key of the UE 110, and a binding relationship between identity information of the UE 110 and the public key of the UE 110. The first key management network element 114 is configured to store a binding relationship between the public key of the UE 110 and at least one PVT allocated by the KMS 112 to the UE 110. Both the first key management network element 114 and the second key management network element 113 are deployment independently of the MNO 111 and the KMS 112.

Main functions of the first key management network element 114 and the second key management network element 113 are as follows:

the first key management network element and the second key management network element.

The MNO is further configured to send a first storage request to the first key management network element, where the first storage request carries the public key of the UE and the identity information of the UE.

The first key management network element is configured to: receive the first storage request, obtain the public key of the UE and the identity information of the UE that are carried in the first storage request, bind the public key of the UE to the identity information of the UE, and store the public key of the UE and the identity information of the UE.

The KMS is further configured to send a second storage request to the second key management network element, where the second storage request carries the public key of the UE and the at least one PVT.

The second key management network element is configured to: receive the second storage request, obtain the public key of the UE and the at least one PVT that are carried in the second storage request, bind the public key of the UE to the at least one PVT, and store the public key of the UE and the at least one PVT.

A principle of obtaining, by the MDM 115, the identity information of the UE 110 from the first key management network element 114 and the second key management network element 113 is as follows:

The MDM is configured to send a first identity query request to the second key management network element, where the first identity query request carries the PVT of the UE.

The second key management network element is further configured to: receive the first identity query request, obtain the PVT of the UE carried in the first identity query request, query for the public key of the UE associated with the to-be-processed PVT, and return, to the MDM, a first identity query response carrying the public key of the UE.

The MDM is further configured to: receive the first identity query response, obtain the public key of the UE carried in the first identity query response, generate a second identity query request based on the public key of the UE, and send the second identity query request to the first key management network element, where the second identity query request carries the public key of the UE.

The first key management network element is further configured to: receive the second identity query request, obtain the public key of the UE carried in the second identity query request, query for the identity information of the UE associated with the public key of the UE, and return, to the MDM, a second identity query response carrying the identity information of the UE.

The MDM receives the second identity query response, and obtains the identity information of the UE carried in the second identity query response.

In the foregoing embodiment, when the MDM needs to query for a real network identity of the UE corresponding to the PVT, the MDM needs to obtain the public key of the UE from a network element associated with the KMS and independent of the KMS, and then obtain, based on the obtained public key of the UE, the identity information of the UE from a network element associated with the MNO and independent of the MNO. This implements tracing of the real identity of the UE based on the anonymous PVT.

Figure 2:
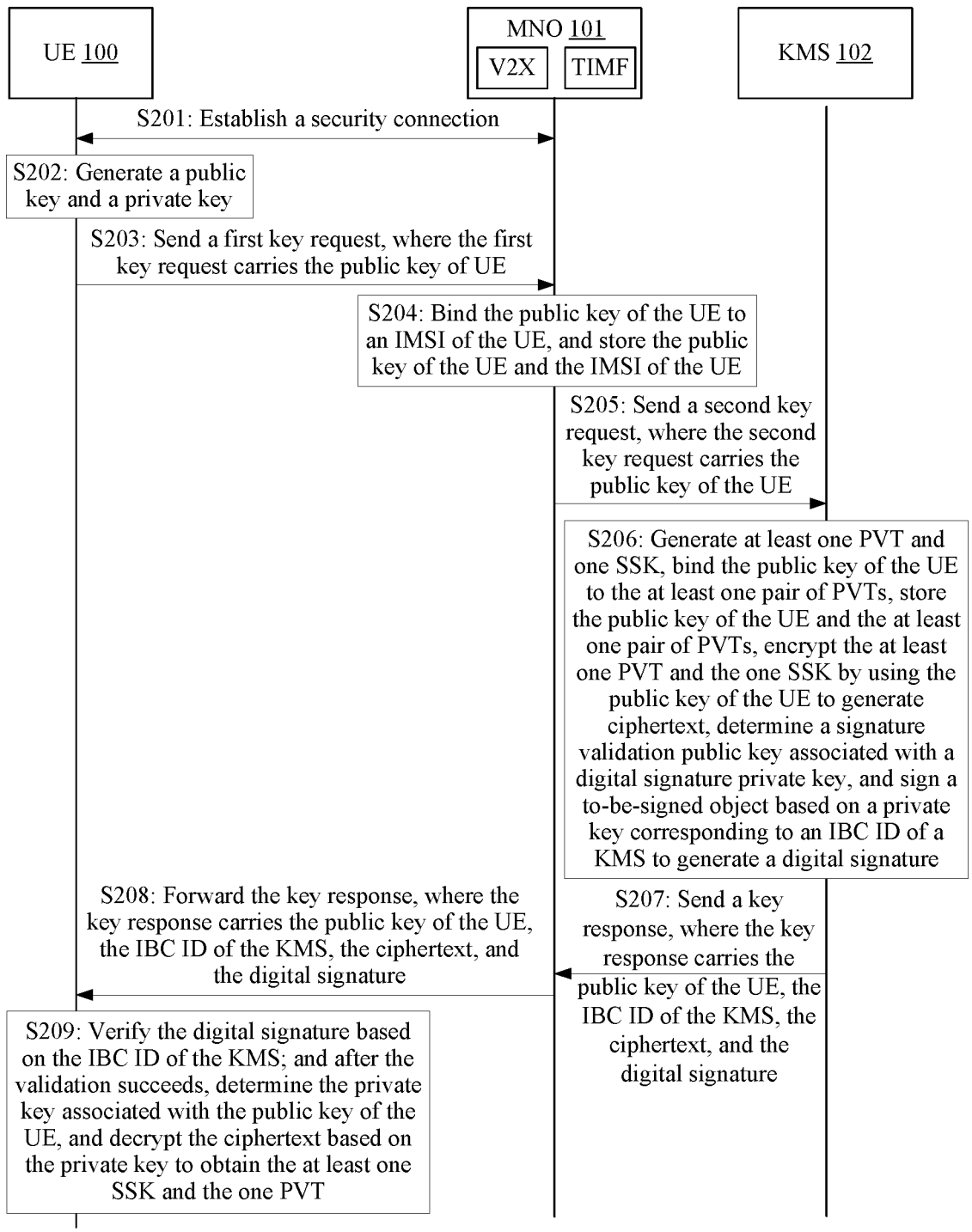
FIG. 2 is a schematic flowchart of a key distribution method according to an embodiment of the present invention.

FIG. 2 shows a key distribution method according to an embodiment of the present invention. In this embodiment of the present invention, the method includes the following steps.

S201: Establish a security connection between UE 100 and an MNO 101.

Specifically, the UE 110 is registered with the MNO 101, and the security connection may be established between the UE 100 and the MNO 101 based on an LTE communications protocol. The UE 100 pre-stores an IBC ID of a KMS 102 and a public key of the KMS, or the UE 100 pre-stores a digital certificate of the KMS, and a public key corresponding to the digital certificate. The foregoing information may be pre-stored in a SIM card of the UE 100. A format of the digital certificate may follow the X.509 V3 international standard. A standard X.509 digital certificate includes the following content: certificate version information; a certificate sequence number, where each certificate has a unique certificate sequence number; a signature algorithm used for the certificate; a name of a certificate issuer, where an X.500 format is usually used as a naming rule; a certificate validity period, where a UTC time format is usually used for a general certificate, and a time range of the UTC time format is 1950-2049; a name of a certificate owner, where an X.500 format is usually used as a naming rule; a public key of the certificate owner; and a certificate signature of the certificate issuer.

S202: The UE 100 generates a pair of public key and private key.

Specifically, the UE 100 may generate, based on PM, the pair of public key and private key that have an association relationship.

S203: The UE 100 sends a first key request to the MNO 101, where the first key request carries the public key of the UE, or the first key request may further carry an IMSI of the UE.

Specifically, the IMSI (International Mobile Subscriber Identification Number, international mobile subscriber identification number) of the UE 100 is a flag used to distinguish between users of a mobile operator. The IMSI is stored in the SIM card of the UE 100. A total length of the IMSI does not exceed 15 bits, and the IMSI is represented by using digits 0 to 9. The IMSI includes an MMC, an MNC, and an MSIN. The MCC is a code of country to which a mobile subscriber belongs, and occupies three digits. A stipulated MCC for China is 460. The MNC is a mobile network code, and includes two or three digits. A mobile network code (MNC) of China Mobile is 00. The MNC is used to identify a mobile communications network to which a mobile subscriber belongs. The MSIN is a mobile subscriber identification number, and is used to identity a mobile subscriber in a mobile communications network.

S204: The MNO 101 binds the public key of the UE 100 to the IMSI of the UE 100, and stores a mapping relationship between the public key of the UE 100 and the IMSI of the UE 100.

Specifically, the MNO 101 obtains the IMSI of the UE 100, and an obtaining method may be as follows: The MNO 101 obtains the IMSI of the UE 100 from the first key request, or obtains the IMSI from a context of the UE 100 when the UE 100 establishes the connection to the MNO 101. The MNO 101 may set a mapping table. Each entry of the mapping table stores a public key and an IMSI of one UE. Different entries of the mapping table store public keys and IMSIs of different UEs.

It should be noted that the MNO 101 may be a TIMF or a V2X (Vehicle to Vehicle Control Function, vehicle-to-vehicle control function, V2x for short) in a LTE-V-based Internet of Vehicles architecture, or a combination of the foregoing two network elements.

S205: The MNO 101 sends a second key request to a KMS 102, where the second key request carries the public key of the UE 100.

Specifically, the MNO 101 generates the second key request based on the public key of the UE 100. The second key request carries the public key of the UE 100, but does not carry the IMSI of the UE 100, so as to prevent the KMS 102 from learning about identity information of the UE 100.

S206: The KMS generates at least one PVT and one SSK, binds the public key of the UE to the at least one PVT, stores the public key of the UE and the at least one PVT, encrypts the at least one PVT and the one SSK by using the public key of the UE to generate ciphertext, and signs a to-be-signed object by using a digital certificate of the KMS to generate a digital signature.

Specifically, the KMS 102 generates, for the UE 100, the at least one PVT and the one secret signing key SSK used for signing that are based on IBC. Each PVT has a specific validity period. When a validity period of a PVT expires, the PVT enters an invalid state. The UE 100 cannot encrypt a message by using the invalid PVT and an invalid SSK. The PVT may be a character string randomly generated by the KMS 102, and the SSK is generated by the KMS 102 based on a global private key and a global public key. The KMS 102 encrypts the at least one PVT and the one SSK by using the public key of the UE 100 to generate the ciphertext. The KMS 102 signs the to-be-signed object by using a private key corresponding to the IBC ID the KMS 102. The to-be-signed object includes the public key of the UE and the generated ciphertext. A signature algorithm includes but is not limited to RSA, DSA, or ECDSA. The KMS 102 further needs to store a mapping relationship between the public key of the UE 100, and the at least one PVT and the one SSK. For example, the KMS sets a mapping table, and each entry of the mapping table stores a public key and at least one PVT that have an association relationship.

S207: The KMS sends a key response to the MNO, where the key response carries an IBC ID of the KMS, the public key of the UE, the ciphertext, and the digital signature.

For example, the public key of the UE 100 is PKx; the KMS 102 generates one PVT and one SSK, represented as (PVT, SSK); ciphertext obtained after the (PVT, SSK) are encrypted based on the public key PKx of the UE is Enc (PVT, SSK); a digital signature obtained after the PKx and the Enc (PVT, SSK) are signed based on the private key corresponding to the IBC ID of the KMS 102 is Sig. Then the key response may be represented as Key Response (IBC ID, PKx, Enc (PVT, SSK), Sig).

S208: The MNO forwards the key response to the UE.

S209: The UE verifies the digital signature based on the IBC ID of the KMS; and after the validation succeeds, determines the private key associated with the public key of the UE, and decrypts the ciphertext based on the private key to obtain the at least one PVT and the one SSK.

Specifically, the UE 100 obtains the IBC ID, the public key of the UE, the ciphertext, and the digital signature that are carried in a key response message. The UE 100 verifies the digital signature based on the IBC ID; and after the validation succeeds, queries for the associated private key based on the public key of the UE, and decrypts the ciphertext by using the private key to obtain the at least one PVT and the one SSK. When the UE 100 needs to communicate with another UE, the UE 100 may sign a message by using the at least one PVT and the one SSK.

In the foregoing embodiment, when the KMS needs to allocate the PVT and the SSK to the UE, the KMS cannot learn about the identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace a real identity of the UE based on the PVT carried in a message signed by the UE by using the (PVT, SSK), thereby achieving high security.

Figure 3:
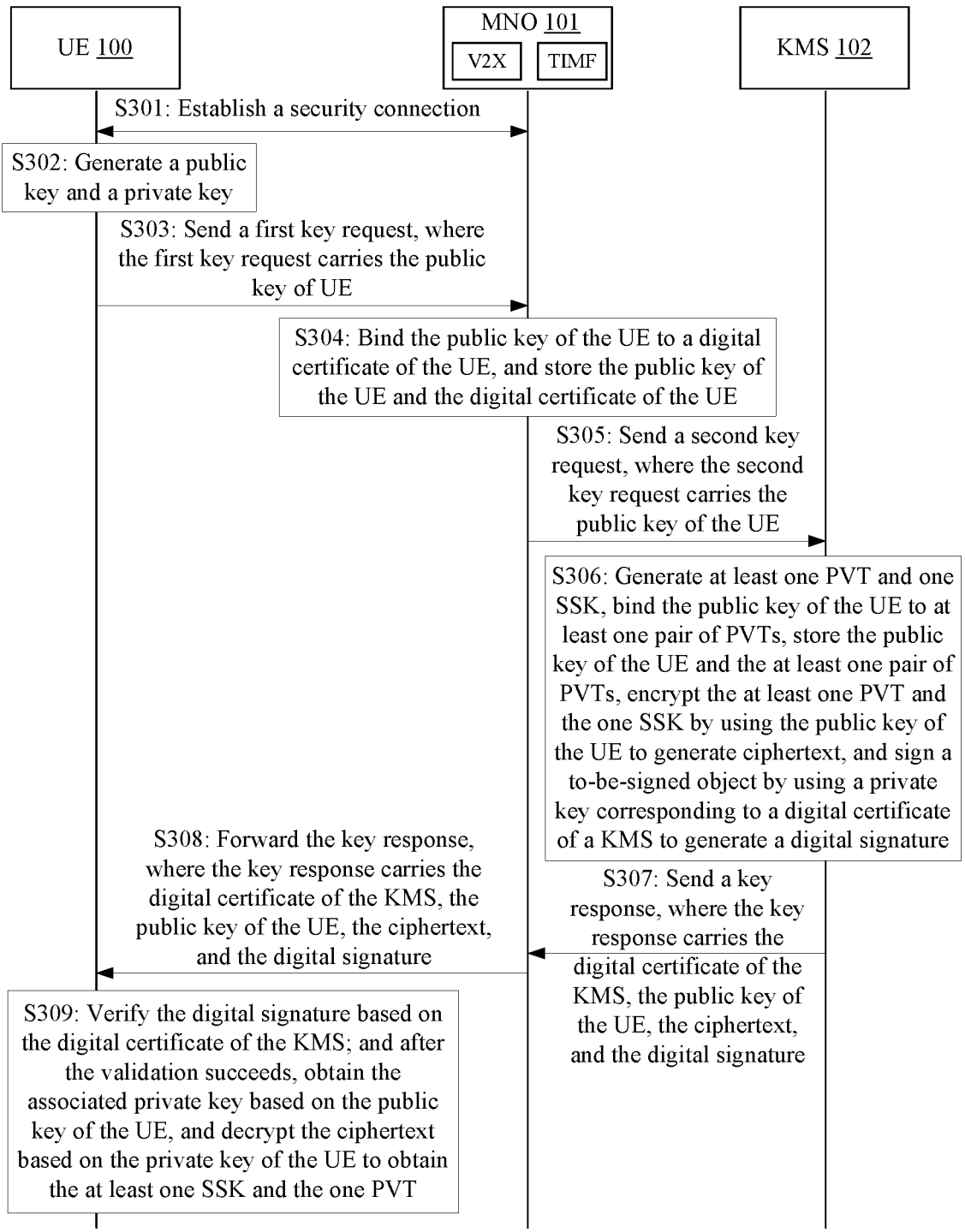
FIG. 3 is another schematic flowchart of a key distribution method according to an embodiment of the present invention.

FIG. 3 is a schematic flowchart of a key distribution method according to an embodiment of the present invention. This embodiment of the present invention is applicable to the network architecture in FIG. 1a. The method includes the following steps.

S301: Establish a security connection between UE 100 and an MNO 101.

Specifically, the UE 110 is registered with the MNO 101, and the security connection may be established between the UE 100 and the MNO 101 based on an LTE communications protocol. The UE 100 pre-stores an IBC ID of a KMS 102 and a public key of the KMS, or the UE 100 pres-tores a digital certificate of the KMS, and a public key corresponding to the digital certificate. The foregoing information may be pre-stored in a SIM card of the UE 100. A format of the digital certificate may follow the X.509 V3 international standard. A standard X.509 digital certificate includes the following content: certificate version information; a certificate sequence number, where each certificate has a unique certificate sequence number; a signature algorithm used for the certificate; a name of a certificate issuer, where an X.500 format is usually used as a naming rule; a certificate validity period, where a UTC time format is usually used for a general certificate, and a time range of the UTC time format is 1950-2049; a name of a certificate owner, where an X.500 format is usually used as a naming rule; a public key of the certificate owner; and a certificate signature of the certificate issuer.

S302: The UE 100 generates a public key and a private key.

Specifically, the UE 100 may generate, based on PM, a pair of public key and private key that have an association relationship.

S303: The UE 100 sends a first key request to the MNO 101, where the first key request carries the public key of the UE 100, or the first key request may further carry a digital certificate of the UE 100.

Specifically, the digital certificate of the UE 100 represents a real identity of the UE. The digital certificate of the UE includes: certificate version information, a certificate sequence number, a signature algorithm used for the certificate, a name of a certificate issuer, a certificate validity period, a public key of a certificate owner, and a certificate signature of the certificate issuer.

S304: The MNO 101 binds the public key of the UE to the digital certificate of the UE, and stores the public key of the UE and the digital certificate of the UE.

Specifically, the MNO 101 obtains the digital certificate of the UE 100. A method for obtaining, by the MNO 101, the digital certificate of the UE 100 may be: obtaining the digital certificate of the UE 100 from the first key request, or obtaining the digital certificate of the UE 100 from a context of the UE 100 when the UE 100 establishes the connection to the MNO 101. The MNO 101 may set a mapping table. Each entry of the mapping table stores a public key and a digital certificate of UE. Different entries of the mapping table store public keys and digital certificates of different UEs.

It should be noted that the MNO 101 may be a TIMF or a V2X (Vehicle to Vehicle Control Function, vehicle-to-vehicle control function, V2x for short) in a LTE-V-based Internet of Vehicles architecture, or a combination of the foregoing two network elements.

S305: The MNO 101 sends a second key request to a KMS 102, where the second key request carries the public key of the UE 100.

Specifically, the MNO 101 generates the second key request based on the public key of the UE 100. The second key request carries the public key of the UE 100, but the second key request cannot carry the digital certificate of the UE 100, so as to prevent the KMS 102 from learning about identity information of the UE 100.

S306: The KMS 102 generates at least one PVT and one SSK, binds the public key of the UE to the at least one PVT, stores the public key of the UE and the at least one PVT, encrypts the at least one PVT and the one SSK by using the public key of the UE to generate ciphertext, and signs a to-be-signed object by using a digital certificate of the KMS to generate a digital signature.

Specifically, the KMS 102 generates, for the UE 100, the at least one PVT and the one secret signing key SSK used for signing that are based on IBC. Each PVT has a specific validity period. When a validity period of a PVT expires, the PVT enters an invalid state. The UE 100 cannot sign a message by using the invalid PVT. The PVT may be a character string randomly generated by the KMS, and the PVT is used to temporarily represent an identity of the UE. The SSK is generated by the KMS 102 based on a global private key and a global public key. The KMS 102 encrypts the at least one PVT and the one SSK by using the public key of the UE 100 to generate the ciphertext. The KMS 102 signs the to-be-signed object by using a private key corresponding to the digital certificate of the KMS 102. The to-be-signed object includes the public key of the UE and the generated ciphertext. A signature algorithm includes but is not limited to RSA, DSA, or ECDSA. The KMS 102 further needs to store a mapping relationship between the public key of the UE, and the at least one PVT and the one SSK. For example, the KMS sets a mapping table, and each entry of the mapping table stores a public key and at least one PVT that have an association relationship.

S307: The KMS 102 sends a key response to the MNO 10, where the key response carries the digital certificate of the KMS, the public key of the UE, the ciphertext, and the digital signature.

For example, the public key of the UE 100 is PKx; the KMS 102 generates one PVT and one SSK, represented as (PVT, SSK); ciphertext obtained after the (PVT, SSK) are encrypted based on the public key PKx of the UE is Enc (PVT, SSK); a digital signature obtained after the PKx and the Enc (PVT, SSK) are signed based on the private key corresponding to the digital certificate of the KMS 102 is Sig. Then the key response may be represented as Key Response (CerKMS, PKx, Enc (PVT, SSK), Sig).

S308: The MNO 101 forwards the key response to the UE 100.

S309: The UE obtains the public key associated with the certificate of the KMS; verifies a signed message by using the public key; and after the validation succeeds, obtains the private key associated with the public key of the UE, and decrypts the ciphertext by using the private key to obtain the at least one PVT and the one SSK.

Specifically, the UE 100 obtains the digital certificate of the KMS, the public key of the UE, the ciphertext, and the digital signature that are carried in a key response message.

The UE 100 verifies the digital signature based on the digital certificate of the KMS; and after the validation succeeds, queries for the associated private key based on the public key of the UE, and decrypts the ciphertext by using the private key to obtain the at least one PVT and the one SSK. When the UE 100 needs to communicate with another UE, the UE 100 may sign a message by using the at least one PVT and the one SSK.

In the foregoing embodiment, when the KMS needs to allocate the PVT and the SSK to the UE, the KMS cannot learn about the identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace the real identity of the UE based on the PVT included in a message signed by the UE by using the (PVT, SSK), thereby achieving high security.

Figure 4:
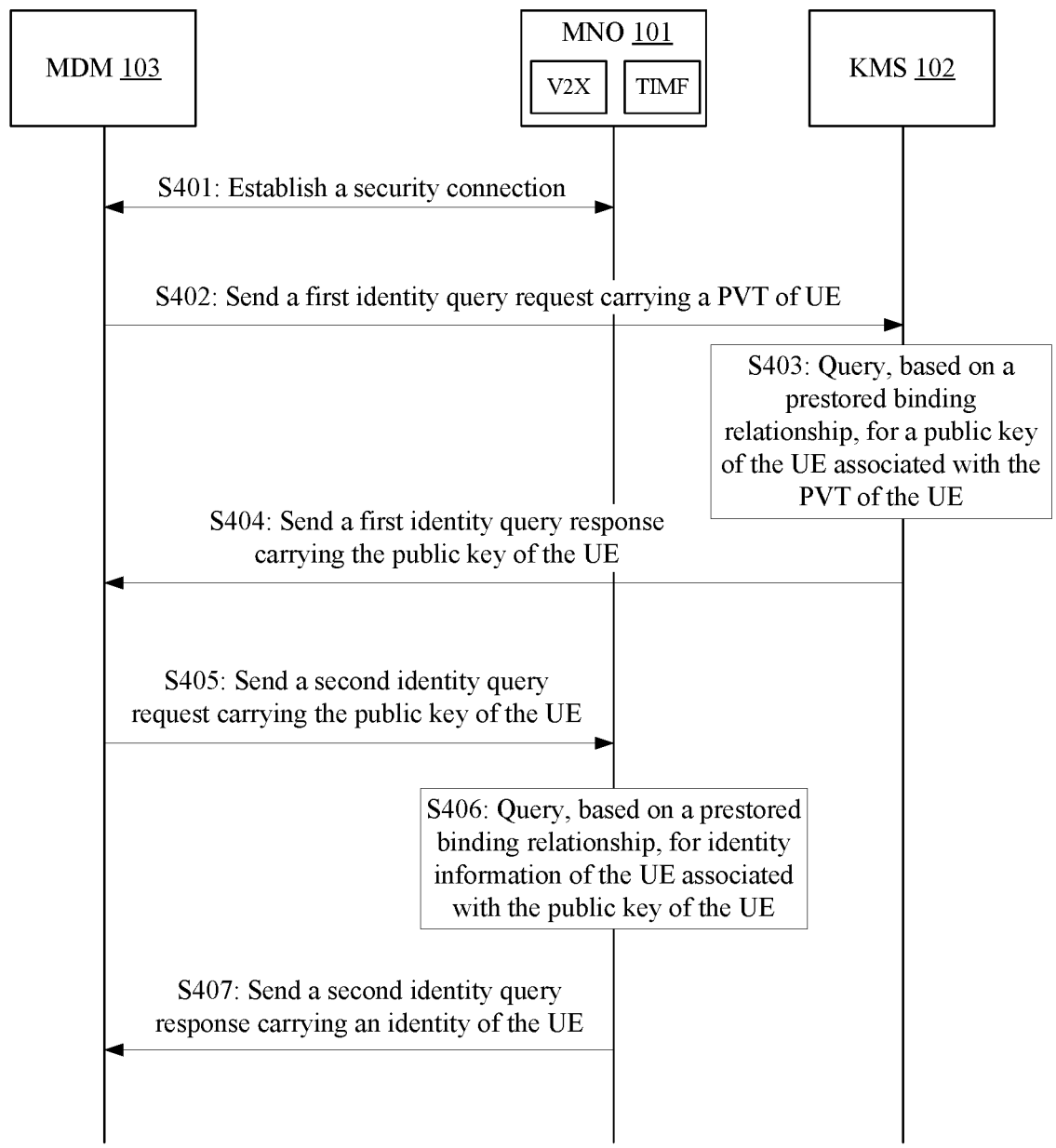
FIG. 4 is another schematic flowchart of a key distribution method according to an embodiment of the present invention.

FIG. 4 is a schematic flowchart of a user identity query method according to an embodiment of the present invention. This embodiment of the present invention is applicable to the network architecture in FIG. 1*a*. The method includes the following steps.

S401: An MDM 103 establishes security connections to an MNO 101 and a KMS 102.

Specifically, the MDM is a trusted network element. The MDM 103 may establish the security connections to the MNO 101 and the KMS 102 based on an LTE communications protocol.

S402: The MDM 103 sends, to the KMS 102, a first identity query request carrying a PVT of UE.

Specifically, the PVT represents a temporary identity of the UE. When the MDM 103 needs to trace a sender of a message, the MDM 103 may extract, from the message, the PVT representing the temporary identity of the UE, and the MDM 103 sends, to the KMS 102, the first identity query request carrying the PVT of the UE.

S403: The KMS queries, based on a prestored binding relationship, for a public key of the UE associated with the PVT of the UE.

Specifically, in a communication key (PVT, SST) allocation process, the KMS stores a binding relationship between at least one PVT and a public key. Therefore, the KMS may query, based on the restored binding relationship, for the public key of the UE associated with the PVT of the UE. In this case, the public key obtained through querying cannot represent a real identity of the UE, and querying needs to be further performed on the MNO.

S404: The KMS 102 sends, to the MDM 103, a first identity query response carrying the public key of the UE.

S405: The MDM 103 sends, to the MNO, a second identity query request carrying the public key of the UE.

Specifically, the MDM 103 receives the first identity query response returned by the KMS 102, extracts the public key of the UE from the first identity query response, generates the second identity query request based on the public key of the UE, and sends the second identity query request to the MNO 101.

S406: The MNO 101 queries, based on a prestored binding relationship, for identity information of the UE associated with the public key of the UE.

Specifically, the MNO 101 receives the second identity query request, and extracts the public key of the UE carried in the second identity query request. In the communication key (PVT, SSK) allocation process, the MNO 101 stores the binding relationship between the public key of the UE and the identity information of the UE. Therefore, the MNO 101 can query, based on the preset binding relationship, for the identity information of the UE associated with the public key of the UE. The identity information of the UE may be an IMSI or a digital certificate.

It should be noted that the MNO 101 may be a TIMF or a V2X (Vehicle to Vehicle Control Function, vehicle-to-vehicle control function, V2x for short) in a LTE-V-based Internet of Vehicles architecture, or a combination of the foregoing two network elements.

S407: The MNO sends, to the MDM, a second identity query response carrying the identity information of the UE.

Specifically, the MNO generates the second identity query response based on the identity information of the UE. The MDM 103 receives the second identity query response, and extracts the identity information of the UE from the second identity query request. The MDM knows the identity information corresponding to the PVT, thereby implementing tracing of an identity of the UE.

In the foregoing embodiment, when the MDM needs to query for the real network identity of the UE corresponding to the PVT, the MDM needs to obtain the public key of the UE from the KMS, and then obtain the identity information of the UE from the MNO based on the obtained public key of the UE. This implements tracing of the real identity of the UE based on the anonymous PVT.

Figure 5A:
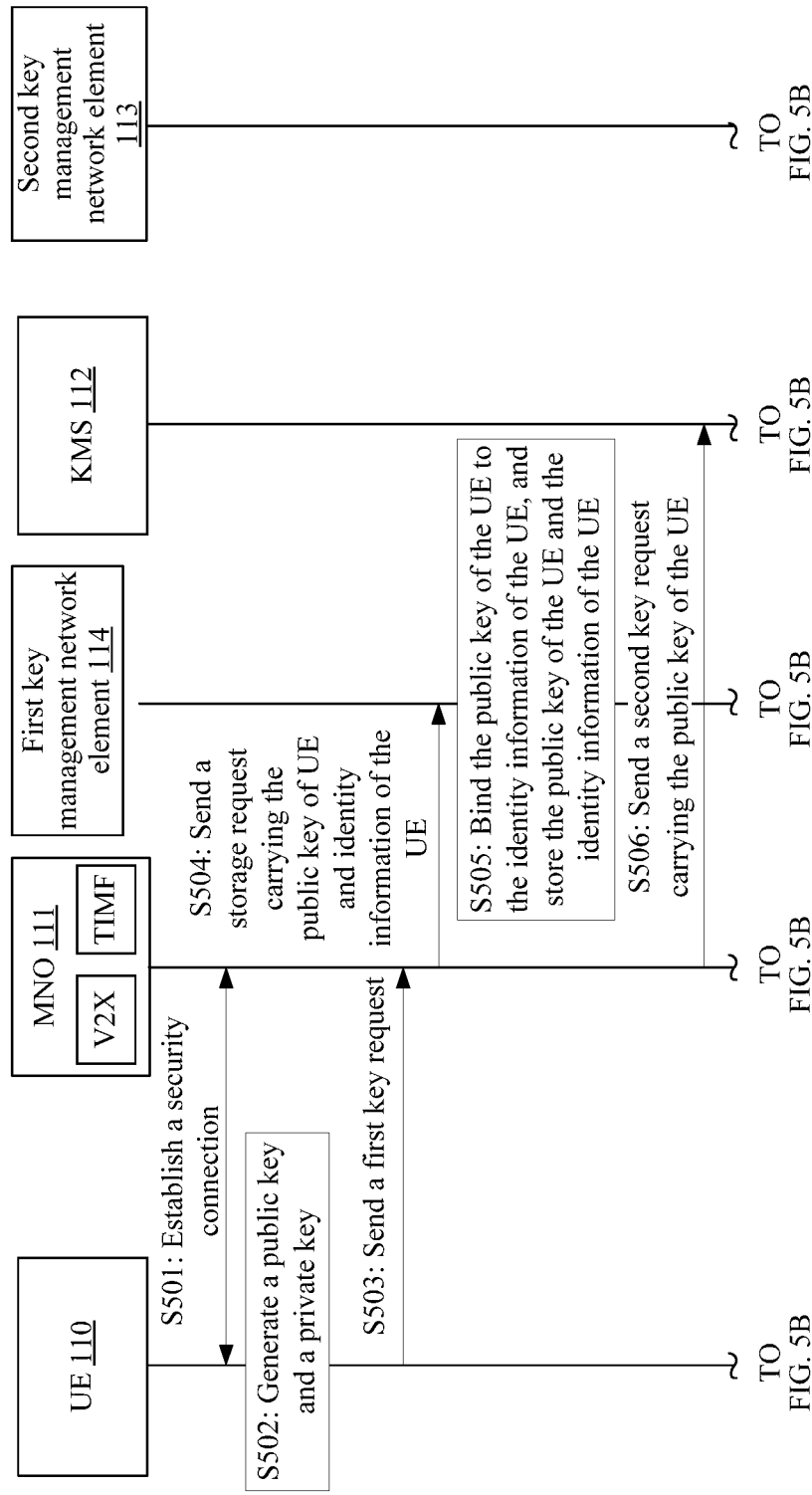
FIG. 5A and FIG. 5B is another schematic flowchart of a key distribution method according to an embodiment of the present invention.
Figure 5B:
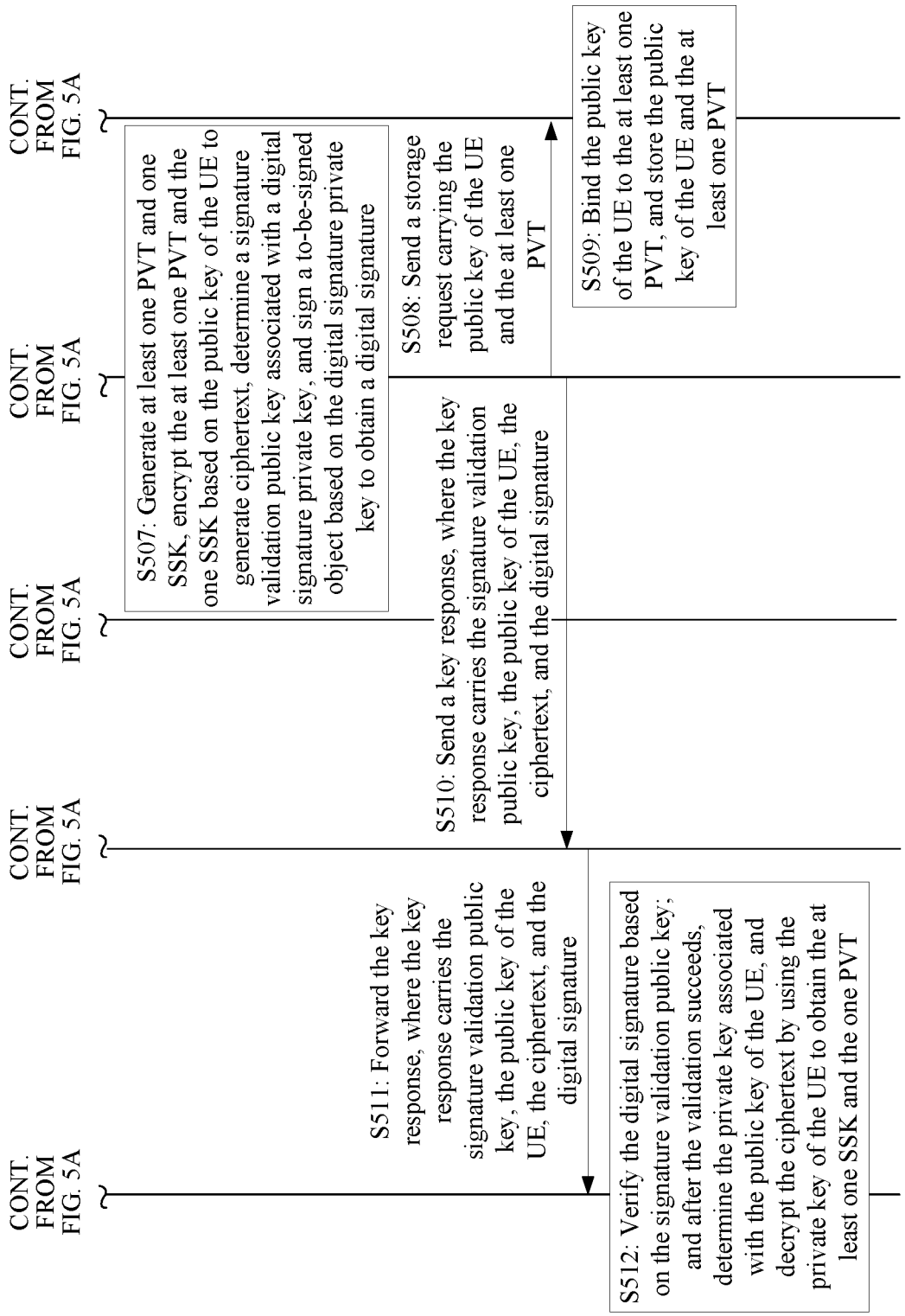

FIG. 5A and FIG. 5B is a schematic flowchart of a key distribution method according to an embodiment of the present invention. This embodiment of the present invention is applicable to the network architecture in FIG. 1*b*. The method includes the following steps.

S501: Establish a security connection between UE 110 and an MNO 111.

Specifically, the UE 110 is registered with the MNO 101, and the security connection may be established between the UE 100 and the MNO 101 based on an LTE communications protocol. The UE 100 pre-stores an IBC ID of a KMS 102 and a public key of the KMS, or the UE 100 pre-stores a digital certificate of the KMS, and a public key corresponding to the digital certificate. The foregoing information may be prestored in a SIM card of the UE 100. A format of the digital certificate may follow the X.509 V3 international standard. A standard X.509 digital certificate includes the following content: certificate version information; a certificate sequence number, where each certificate has a unique certificate sequence number; a signature algorithm used for the certificate; a name of a certificate issuer, where an X.500 format is usually used as a naming rule; a certificate validity period, where a UTC time format is usually used for a general certificate, and a time range of the UTC time format is 1950-2049; a name of a certificate owner, where an X.500 format is usually used as a naming rule; a public key of the certificate owner; and a certificate signature of the certificate issuer.

S502: The UE 110 generates a public key and a private key.

Specifically, the UE 100 may generate, based on PM, a pair of public key and private key that have an association relationship.

S503: The UE 110 sends, to the MNO 111, a first key request carrying the public key of the UE, where the first key request may further carry identity information of the UE.

Specifically, the identity information of the UE includes a digital certificate and an IMSI. The IMSI is a flag used to distinguish between users of a mobile operator. The IMSI is stored in the SIM card of the UE 100. A total length of the IMSI does not exceed 15 bits, and the IMSI is represented by using digits 0 to 9. The IMSI includes an MMC, an MNC, and an MSIN. The MCC is a code of country to which a mobile subscriber belongs, and occupies three digits. A stipulated MCC for China is 460. The MNC is a mobile network code, and includes two or three digits. A mobile network code (MNC) of China Mobile is 00. The MNC is used to identify a mobile communications network to which a mobile subscriber belongs. The MSIN is a mobile subscriber identification number, and is used to identity a mobile subscriber in a mobile communications network.

S504: The MNO 111 sends, to a first key management network element 114, a storage request carrying the public key of the UE and the identity information of the UE.

Specifically, the MNO 111 obtains the identity information of the UE. The MNO 111 may obtain the identity information of the UE 110 from the first key request, or obtain the identity information of the UE 110 from a context of the connection established by the UE 110. The storage request is used to instruct the first key management network element 114 to store a binding relationship between the public key of the UE 110 and the identity information of the UE.

S505: The first key management network element 114 binds the public key of the UE to the identity information of the UE, and stores the public key of the UE 110 and the identity information of the UE.

Specifically, the first key management network element 114 may set a mapping table. Each entry of the mapping table stores one public key and one piece of identity information of UE. Different entries of the mapping table store public keys of different UEs and identity information of different UEs.

S506: The MNO 111 sends, to a KMS 112, a second key request carrying the public key of the UE 110.

Specifically, the MNO 111 generates the second key request based on the public key of the UE 110. The second key request carries the public key of the UE 110, but the second key request cannot carry the identity information of the UE 110, so as to prevent the KMS 112 from learning about the identity information of the UE 110.

It should be noted that the MNO 111 may be a TIMF or a V2X (Vehicle to Vehicle Control Function, vehicle-to-vehicle control function, V2x for short) in a LTE-V-based Internet of Vehicles architecture, or a combination of the foregoing two network elements.

S507: The KMS 112 generates at least one PVT and one SSK, encrypts the at least one PVT and the one SSK based on the public key of the UE to generate ciphertext, determines a signature validation public key associated with a digital signature private key, and signs a to-be-signed object based on the digital signature private key to obtain a digital signature.

Specifically, the KMS 102 generates, for the UE 100, the at least one PVT and the one secret signing key SSK used for signing that are based on IBC. Each PVT has a specific validity period. When a validity period of a PVT expires, the PVT enters an invalid state. The UE 100 cannot sign a message by using the invalid PVT and the SSK. The PVT may be a character string randomly generated by the KMS, and the SSK is generated by the KMS 102 based on a global private key and a global public key. The KMS 102 encrypts the at least one PVT and the one SSK by using the public key of the UE to generate the ciphertext. The KMS 102 signs the to-be-signed object by using the digital signature private key. The digital signature private key includes but is not limited to: a private key corresponding to the IBC ID of the KMS, or a private key corresponding to the digital certificate of the KMS. The to-be-signed object includes the public key of the UE and the generated ciphertext. A signature algorithm includes but is not limited to RSA, DSA, or ECDSA.

S508: The KMS 112 sends, to a second key management network element 113, a storage request carrying the public key of the UE and the at least one PVT.

Specifically, the storage request is used to instruct the second key management network element 113 to store a binding relationship between the public key of the UE and the at least one PVT.

S509: The second key management network element 113 binds the public key of the UE to the at least one PVT, and stores the public key of the UE and the at least one PVT.

The second key management network element 113 may set a mapping table. Each entry of the mapping table stores a public key and at least one PVT that have an association relationship.

S510: The KMS 112 sends a key response to the MNO 111, where the key response carries the signature validation public key, the public key of the UE, the ciphertext, and the digital signature.

For example, the public key of the UE 110 is PKx; the KMS 112 generates one PVT and one SSK, represented as (PVT, SSK); ciphertext obtained after the (PVT, SSK) are encrypted based on the public key PKx of the UE 110 is Enc (PVT, SSK); a digital signature obtained after the PKx and the Enc (PVT, SSK) are signed based on the digital signature private key of the KMS 112 is Sig. Then the key response may be represented as Key Response (IBC ID, PKx, Enc (PVT, SSK), Sig).

S511: The MNO 111 returns the key response to the UE 110, where the key response carries the signature validation public key, the public key of the UE, the ciphertext, and the digital signature.

S512: The UE 110 verifies the digital signature based on the signature validation public key; and after the validation succeeds, determines the private key associated with the public key of the UE, and decrypts the ciphertext based on the private key of the UE to obtain the at least one SSK and the one PVT.

Specifically, the UE 110 obtains the signature validation public key, the public key of the UE, the ciphertext, and the digital signature that are carried in a key response message. The UE 110 verifies the digital signature based on the signature validation public key; and after the validation succeeds, queries for the associated private key based on the public key of the UE, and decrypts the ciphertext by using the private key to obtain the at least one PVT and the one SSK. When the UE 110 needs to communicate with another UE, the UE 110 may encrypt a message by using the at least one PVT and the one SSK.

In the foregoing embodiment, when the KMS needs to allocate the PVT and the SSK to the UE, the KMS cannot learn about the identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace a real identity of the UE based on the PVT included in a message signed by the UE by using the (PVT, SSK), thereby achieving high security.

Figure 6:
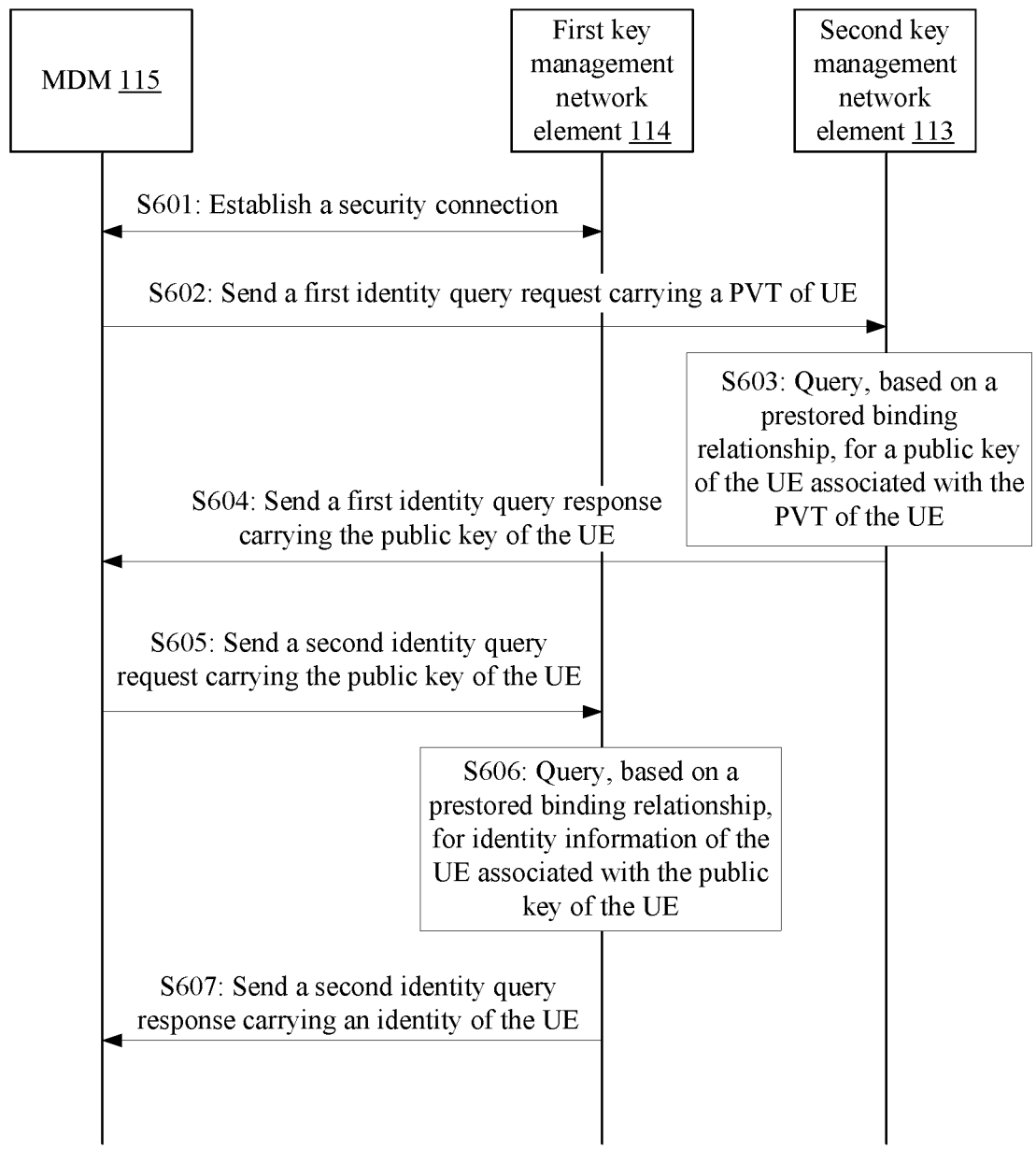
FIG. 6 is another schematic flowchart of a key distribution method according to an embodiment of the present invention.

FIG. 6 is a schematic flowchart of a user identity tracing method according to an embodiment of the present invention. This embodiment of the present invention is applicable to the network architecture in FIG. 1b. The method includes the following steps.

S601: An MDM 115 establishes security connections to a first key management network element 114 and a second key management network element 113.

Specifically, the MDM 115 is a trusted network element. The MDM 115 may establish the security connections to the first key management network element 114 and the second key management network element 113 based on an LTE communications protocol.

S602: The MDM 115 sends, to the second key management network element 113, a first identity query request carrying a PVT of UE.

Specifically, the PVT represents a temporary identity of the UE. When the MDM 115 needs to trace a sender of a message, the MDM 115 may extract, from the message, the PVT representing the temporary identity of the UE, and the MDM 115 sends, to the second key management network element 113, the first identity query request carrying the PVT of the UE.

S603: The second key management network element 113 queries, based on a prestored binding relationship, for a public key of the UE associated with the PVT of the UE.

Specifically, in a communication key (PVT and SST) allocation process, a KMS stores a binding relationship between at least one PVT and a public key. Therefore, the KMS may query, based on the restored binding relationship, for the public key of the UE associated with the PVT of the UE. In this case, the public key obtained through querying cannot represent a real identity of the UE, and querying needs to be further performed on an MNO.

S604: The second key management network element 113 sends, to the MDM 115, a second identity query request carrying the public key of the UE.

S605: The MDM 115 sends, to the first key management network element 114, a second identity query request carrying the public key of the UE.

Specifically, the MDM 115 receives the first identity query response returned by the second key management network element 113, extracts the public key of the UE from the first identity query response, generates the second identity query request based on the public key of the UE, and sends the second identity query request to the first key management network element 114.

S606: The first key management network element 114 queries, based on a prestored binding relationship, for identity information of the UE associated with the public key of the UE.

Specifically, the first key management network element 114 receives the second identity query request, and extracts the public key of the UE carried in the second identity query request. In the communication key (PVT and SSK) allocation process, the first key management network element 114 stores the binding relationship between the public key of the UE and the identity information of the UE. Therefore, the first key management network element 114 can query, based on the preset binding relationship, for the identity information of the UE associated with the public key of the UE. The identity information of the UE may be an IMSI or a digital certificate.

S607: The first key management network element 114 sends, to the MDM 115, a second identity query response carrying the identity information of the UE.

Specifically, the MNO generates the second identity query response based on the identity information of the UE. The MDM 115 receives the second identity query response, and extracts the identity information of the UE from the second identity query request. The MDM knows the identity information corresponding to the PVT, thereby implementing tracing of an identity of the UE.

In the foregoing embodiment, when the MDM needs to query for the real network identity of the UE corresponding to the PVT, the MDM needs to obtain the public key of the UE from a network element associated with the KMS and independent of the KMS, and then obtain, based on the obtained public key of the UE, the identity information of the UE from a network element associated with the MNO and independent of the MNO. This implements tracing of the real identity of the UE based on the anonymous PVT.

Figure 7:
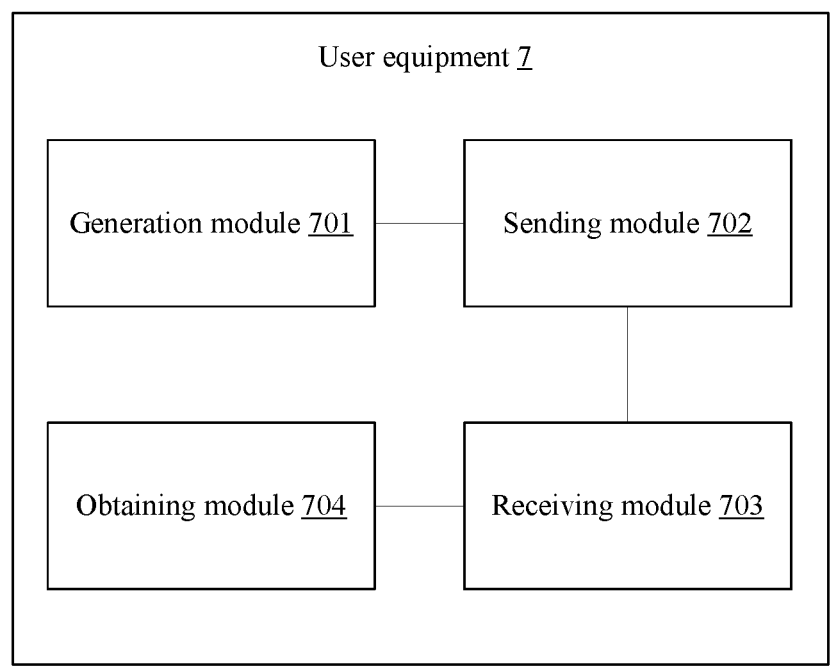
FIG. 7 is a schematic structural diagram of user equipment according to an embodiment of the present invention.

FIG. 7 is a schematic structural diagram of user equipment according to an embodiment of the present invention. For terms and processes included in this embodiment of the present invention, refer to descriptions in the embodiments of FIG. 2, FIG. 3, and FIG. 5A and FIG. 5B. The user equipment 7 includes: a generation module 701, a sending module 702, a receiving module 703, and an obtaining module 704.

The generation module 701 is configured to generate a public key and a private key that have an association relationship.

The sending module 702 is configured to send a key request to a mobile operator network element MNO, where the key request carries the public key of the user equipment UE.

The receiving module 703 is configured to receive a key response returned by the MNO, where the key response carries a signature validation public key, the public key of the UE, ciphertext, and a digital signature.

The obtaining module 704 is configured to: verify the digital signature based on the signature validation public key; and after the validation succeeds, obtain the private key associated with the public key of the UE, decrypt the ciphertext based on the private key of the UE to obtain at least one PVT and one secret signing key SSK used for signing that are based on identity-based cryptography IBC, and store the at least one PVT and the one SSK.

Optionally, identity information of the UE includes an IMSI of the UE or a digital certificate of the UE.

Optionally, the digital validation public key is an IBC ID of a KMS, a PVT of the KMS, or a digital certificate of the KMS.

This embodiment of the present invention and the embodiments of FIG. 2, FIG. 3, and FIG. 5A and FIG. 5B are based on a same idea and bring a same technical effect. For a specific process, refer to the descriptions in the embodiments of FIG. 2, FIG. 3, and FIG. 5A and FIG. 5B. Details are not described herein again.

Figure 8:
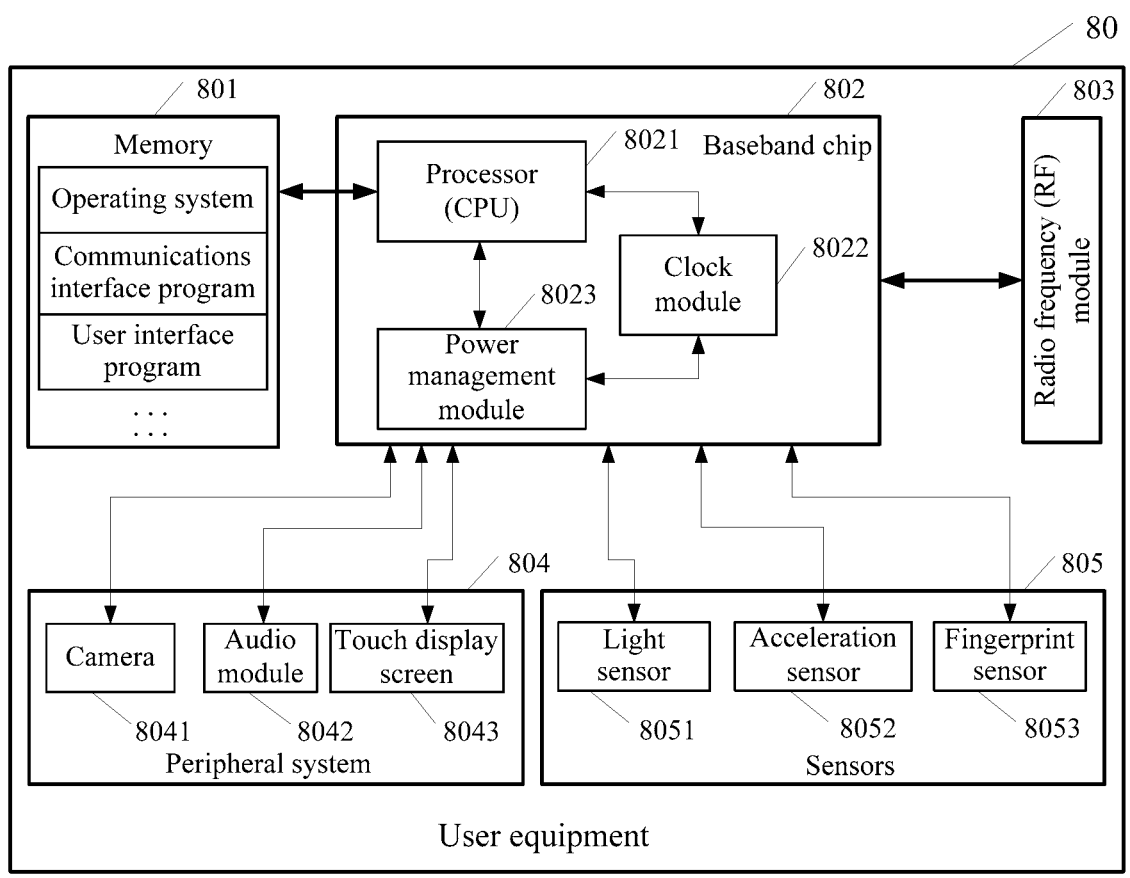
FIG. 8 is another schematic structural diagram of user equipment according to an embodiment of the present invention.

FIG. 8 is a schematic structural diagram of user equipment 80 according to an embodiment of the present invention. The user equipment 80 may include: a memory 801, a baseband chip 802, a radio frequency module 803, a peripheral system 804, and sensors 805. The baseband chip 802 includes: at least one processor 8021, such as a CPU, a clock module 8022, and a power management module 8023. The peripheral system 804 includes: a camera 8041, an audio module 8042, a touch display screen 8043, and the like. Further, the sensors 805 may include: a light sensor 8051, an acceleration sensor 8052, a fingerprint sensor 8053, and the like. A quantity of modules included in the peripheral system 804 and the sensors 805 may be increased or decreased according to an actual requirement. Any two of the foregoing modules that are connected may be specifically connected by using a bus. The bus may be an Industry Standard Architecture (English: industry standard architecture, ISA for short) bus, a Peripheral Component Interconnect (English: peripheral component interconnect, PCI for short) bus, an Extended Industry Standard Architecture (English: extended industry standard architecture, EISA for short) bus, or the like.

The radio frequency module 803 may include an antenna and a transceiver (including a modem). The transceiver is configured to convert an electromagnetic wave received by the antenna into a current, and finally convert the current into a digital signal. Correspondingly, the transceiver is further configured to convert, into a current, a digital signal to be output by the mobile phone, and then convert the current into an electromagnetic wave. Finally, the electromagnetic wave is transmitted to free space by using the antenna. The radio frequency module 803 may further include at least one amplifier configured to amplify a signal. Usually, the radio frequency module 803 may be used to perform radio transmission, for example, Bluetooth (English: Bluetooth) transmission, Wireless Fidelity (English: Wireless Fidelity, Wi-Fi for short) transmission, 3rd generation mobile communications technology (English: 3rd Generation, 3G for short) transmission, or 4th generation mobile communications technology (English: the 4th Generation mobile communication, 4G for short) transmission.

The touch display screen 8043 may be configured to display information entered by a user, or display information to a user, for example, may display various menus of the user equipment 80. The touch display screen 8043 may include a touch panel and a display panel. Optionally, the display panel may be configured in a form of a liquid crystal display (English: Liquid Crystal Display, LCD for short), an organic light-emitting diode (English: Organic Light-Emitting Diode, OLED for short), or the like. Further, the touch panel may cover the display panel. After detecting a touch operation on or near the touch panel, the touch panel transmits the touch operation to the processor 8021 to determine a type of a touch event. Then the processor 8021 provides a corresponding visual output on the display panel based on the type of the touch event. The touch panel and the display panel are used as two independent components to implement input and output functions of the user equipment 80. However, in some embodiments, the touch panel and the display panel may be integrated to implement the input and output functions of the user equipment 80.

The camera 8041 is configured to expose a surrounding environment to obtain a frame image. In a manner, the camera 8041 transfers, to the processor 8021, a parameter of the frame image obtained through exposure, so that the processor 8021 performs processing, such as enhancement and noise cancellation, on the frame image, to generate a picture that can be displayed to the user. In another optional solution, the camera is equipped with an image processor chip. The image processing chip may perform preliminary processing on the frame image. After the preliminary processing is performed on the frame image, processed data is transferred to the processor 8021, so that the processor 8021 finally generates an image that can be displayed to the user. Further, there may be one or more cameras 8041.

The audio module 8042 may provide an audio interface between the user and the user equipment 80. The audio module 8042 may transmit, to a speaker, an electrical signal converted from received audio data. The speaker converts the electrical signal into an acoustical signal, and outputs the acoustical signal. On the other hand, the audio module 8042 may obtain an acoustical signal in the surrounding environment, convert the acoustical signal into a digital signal, and then transfer the digital signal to the processor 8021 for processing.

The sensors 805 are configured to sense a related signal. For example, the light sensor 8051 may sense light intensity in the surrounding environment of the user equipment 80, the acceleration sensor 8052 may sense a real-time acceleration value of the user equipment 80, and the fingerprint sensor 8053 may sense fingerprint information entered by the user on the user equipment 80. After sensing the related signal, the sensors 805 quantizes the signal into a digital signal, and transfers the digital signal to the processor 8021 for further processing.

The memory 801 may be a high-speed RAM memory, or may be a non-volatile memory (non-volatile memory), for example, at least one magnetic disk memory. Optionally, the memory 801 may further include at least one storage apparatus located far away from the processor 8021. The memory 801 may specifically include an instruction storage area and a data storage area. The instruction storage area may store programs such as an operating system, a user interface program, and a communications interface program. The data storage area may store data required for performing a related operation, or data generated when a related operation is performed.

The processor 8021 is a control center of the user equipment 80, connects various parts of an entire mobile phone by using various interfaces and lines, and executes various functions of the user equipment 80 by running the programs stored in the memory 801 and invoking data stored in the memory 801. Optionally, the processor 8021 may include one or more application processors. The application processor mainly processes an operating system, a user interface, an application program, and the like. In this embodiment of the present invention, the processor 8021 is further configured to invoke an instruction and data in the memory to perform the following operations:

generating a public key and a private key that have an association relationship;

sending a key request to a mobile operator network element MNO, where the key request carries the public key of the user equipment UE;

receiving a key response returned by the MNO, where the key response carries a signature validation public key, the public key of the UE, ciphertext, and a digital signature; and verifying the digital signature based on the signature validation public key; and after the validation succeeds, obtaining the private key associated with the public key of the UE, decrypting the ciphertext based on the private key of the UE to obtain at least one PVT and one secret signing key SSK used for signing that are based on identity-based cryptography IBC, and storing the at least one PVT and the one SSK.

Optionally, identity information of the UE includes an IMSI of the UE or a digital certificate of the UE.

Optionally, the digital validation public key is an IBC ID of a KMS, a PVT of the KMS, or a digital certificate of the KMS.

Figure 9:
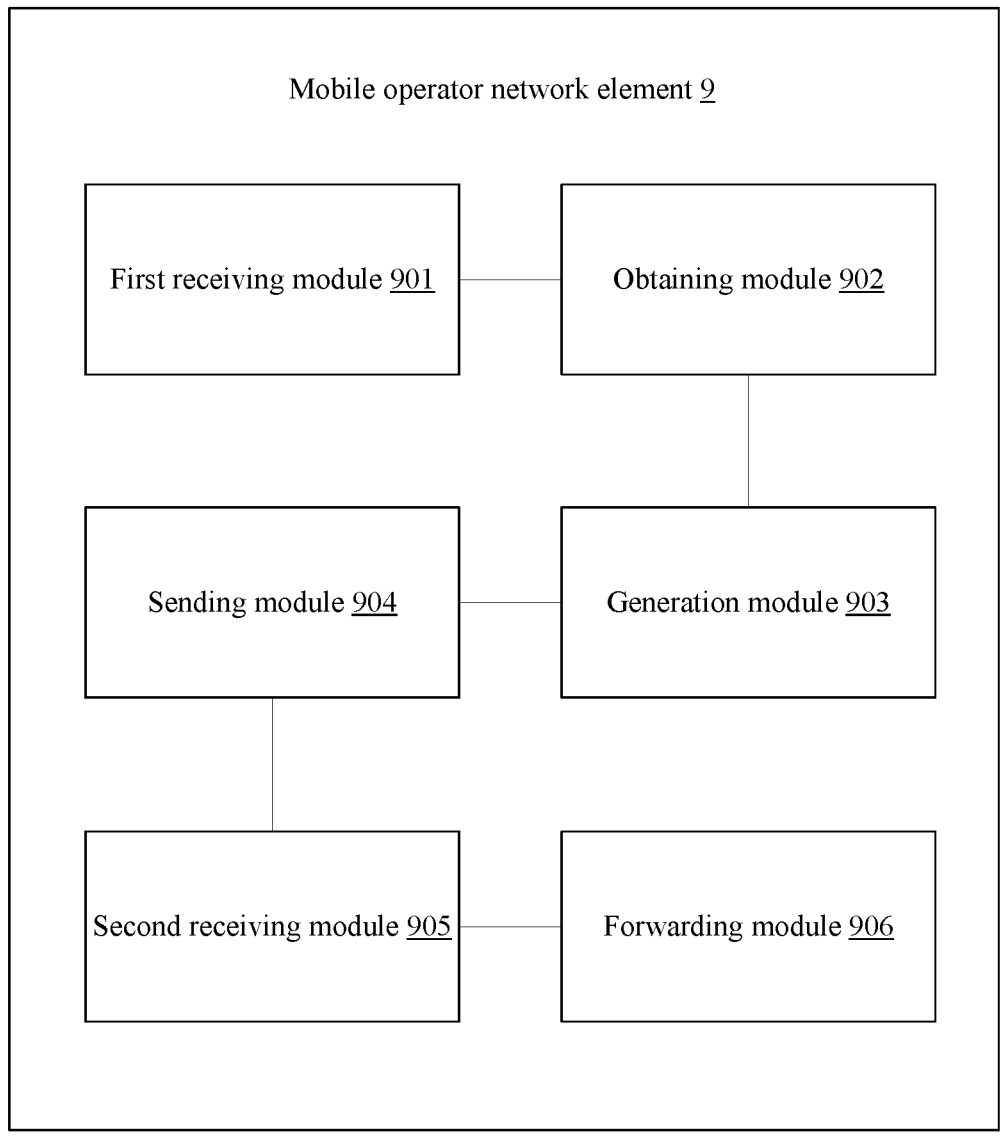
FIG. 9 is a schematic structural diagram of a mobile operator network element according to an embodiment of the present invention.

FIG. 9 is a schematic structural diagram of a mobile operator network element according to an embodiment of the present invention. For terms and processes included in this embodiment of the present invention, refer to descriptions in the embodiments of FIG. 2 to FIG. 6. The mobile operator network element 9 includes: a first receiving module 901, an obtaining module 902, a generation module 903, a sending module 904, a second receiving module 905, and a forwarding module 906.

The first receiving module 901 is configured to receive a first key request sent by user equipment UE, where the first key request carries a public key of the UE.

The obtaining module 902 is configured to obtain the public key of the UE carried in the first key request.

The generation module 903 is configured to generate a second key request based on the public key of the UE, where the second key request carries the public key of the UE.

The sending module 904 is configured to send the second key request to a KMS.

The second receiving module 905 is configured to receive a key response returned by the KMS based on the second key request, where the key response carries a signature validation public key, the public key of the UE, ciphertext, and a digital signature.

The forwarding module 906 is configured to forward the key response to the UE.

Optionally, the first key request further carries identity information of the UE.

The mobile operator network element 9 further includes: a binding module, configured to bind the public key of the UE to the identity information of the UE, and store the public key of the UE and the identity information of the UE.

Optionally, the mobile operator network element further includes:

a binding indication module, configured to: obtain the identity information of the UE, and send a storage request to an associated key management network element, where the storage request carries the public key of the UE and the identity information of the UE, and the storage request is used to instruct the key management network element to: bind the public key of the UE to the identity information of the UE, and store the public key of the UE and the identity information of the UE.

Optionally, the mobile operator network element further includes:

a third receiving module, configured to receive an identity query request sent by a misbehavior detection and management network element MDM, where the identity query request carries the public key of the UE;

a query module, configured to query for the identity information of the UE associated with the public key of the UE; and a response module, configured to return an identity query response to the MDM, where the identity query response carries the identity information of the UE.

This embodiment of the present invention and the embodiments of FIG. 2 to FIG. 6 are based on a same idea and bring a same technical effect. For a specific process, refer to the descriptions in the embodiments of FIG. 2 to FIG. 6. Details are not described herein again.

In the foregoing embodiment, when the KMS needs to allocate a PVT and an SSK to the UE, the KMS cannot learn about the identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace a real identity of the UE based on the PVT included in a message signed by the UE by using the (PVT, SSK), thereby achieving high security.

Figure 10:
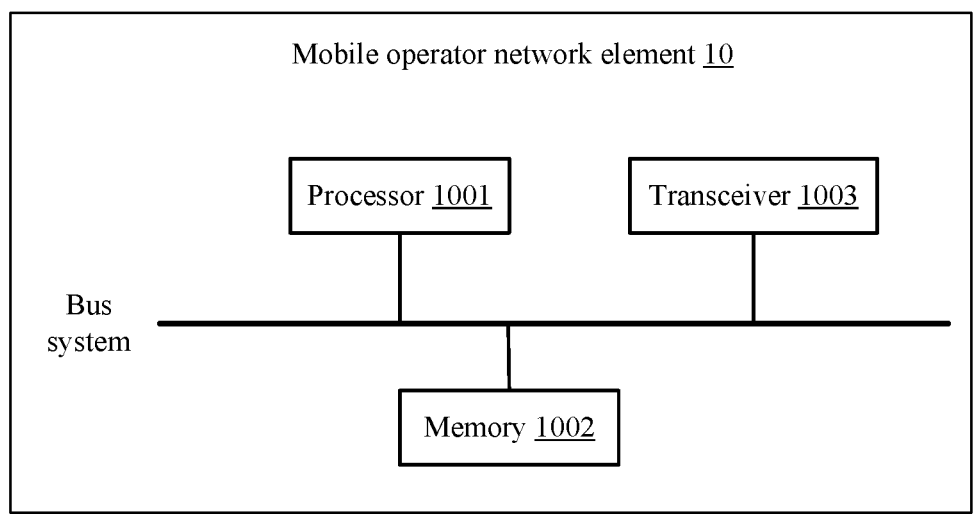
FIG. 10 is another schematic structural diagram of a mobile operator network element according to an embodiment of the present invention.

FIG. 10 is a schematic structural diagram of a mobile operator network element according to an embodiment of the present invention. In this embodiment of the present invention, the mobile operator network element 10 includes: a processor 1001, a memory 1002, and a transceiver 1003. The transceiver 1003 is configured to send data to or receive data from an external device. There may be one or more processors 1001 in the mobile operator network element 10. In some embodiments of the present invention, the processor 1001, the memory 1002, and the transceiver 1003 may be connected by using a bus system or in another manner. The mobile operator network element 10 may be configured to perform the methods shown in FIG. 2 to FIG. 6. For meanings of terms and examples that are included in this embodiment, refer to the embodiments corresponding to FIG. 2 to FIG. 6. Details are not described herein again.

The memory 1002 stores program code. The processor 1001 is configured to invoke the program code stored in the memory 1002, to perform the following operations:

receiving, by the mobile operator network element MNO, a first key request sent by user equipment UE, where the first key request carries a public key of the UE;

obtaining the public key of the UE carried in the first key request;

generating a second key request based on the public key of the UE, where the second key request carries the public key of the UE;

sending the second key request to a KMS;

receiving a key response returned by the KMS based on the second key request, where the key response carries a signature validation public key, the public key of the UE, ciphertext, and a digital signature; and forwarding the key response to the UE.

Optionally, the processor 1001 is further configured to: obtain identity information of the UE carried in the first key request, bind the public key of the UE to the identity information of the UE, and store the public key of the UE and the identity information of the UE.

Optionally, the processor 1001 is further configured to:

send a storage request to an associated key management network element, where the storage request carries the public key of the UE and the identity information of the UE, and the storage request is used to instruct the key management network element to: bind the public key of the UE to the identity information of the UE, and store the public key of the UE and the identity information of the UE.

Optionally, the processor 1001 is further configured to: receive an identity query request sent by a misbehavior detection and management network element MDM, where the identity query request carries the public key of the UE;

query for the identity information of the UE associated with the public key of the UE; and return an identity query response to the MDM, where the identity query response carries the identity information of the UE.

In the foregoing embodiment, when the KMS needs to allocate a PVT and an SSK to the UE, the KMS cannot learn about the identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace a real identity of the UE based on the PVT included in a message signed by the UE by using the (PVT, SSK), thereby achieving high security.

Figure 11:
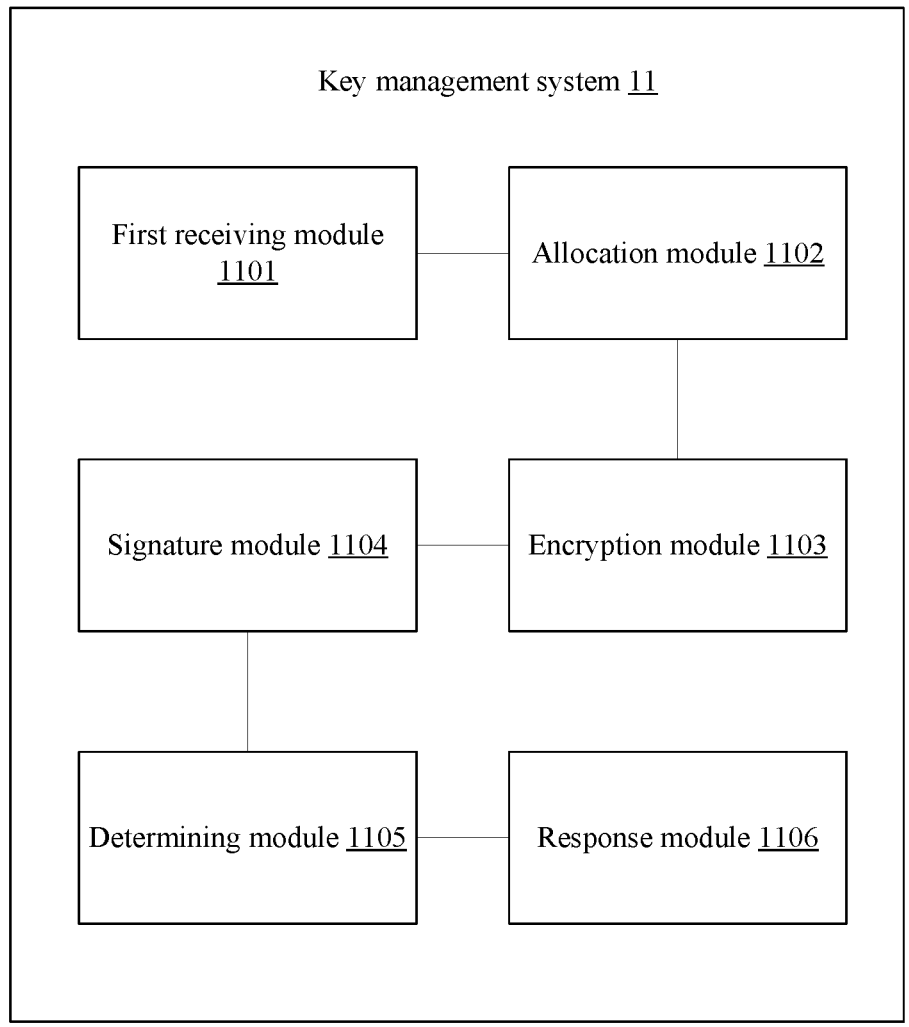
FIG. 11 is a schematic structural diagram of a key management system according to an embodiment of the present invention.

FIG. 11 is a schematic structural diagram of a key management system according to an embodiment of the present invention. For terms and processes included in this embodiment of the present invention, refer to descriptions in the embodiments of FIG. 2 to FIG. 6. The key management system 11 includes: a first receiving module 1101, an allocation module 1102, an encryption module 1103, a signature module 1104, a determining module 1105, and a response module 1106.

The first receiving module 1101 is configured to receive a key request sent by a mobile operator network element MON, where the key request carries a public key of UE.

The allocation module 1102 is configured to allocate, to the UE, at least one PVT and one secret signing key SSK used for signing that are based on identity-based cryptography IBC.

The encryption module 1103 is configured to encrypt the at least one PVT and the one SSK based on the public key of the UE to generate ciphertext.

The signature module 1104 is configured to sign a to-be-signed object based on a preset digital signature private key to generate a digital signature, where the to-be-signed object includes the public key of the UE, the at least one PVT, and the one SSK.

The determining module 1105 is configured to determine a signature validation public key associated with the digital signature private key.

The response module 1106 is configured to return a key response to the MON, where the key response carries the signature validation private key, the public key of the UE, the ciphertext, and the digital signature.

Optionally, the key management system 11 further includes:

a binding module, configured to: bind the public key of the UE to the at least one PVT, and store the public key of the UE and the at least one PVT.

Optionally, the key management system 11 further includes:

a binding indication module, configured to send a storage request to an associated key management network element, where the storage request carries the public key of the UE and the at least one PVT, and the storage request is used to instruct the key management network element to: bind the public key of the UE to the at least one PVT, and store the public key of the UE and the at least one PVT.

Optionally, the key management system 11 further includes:

a second receiving module, configured to receive an identity query request sent by an MDM, where the identity query request carries the PVT of the UE;

a query module, configured to query for the public key of the UE associated with the PVT of the UE; and the response module, configured to return an identity query response to the MDM, where the identity query response carries the public key of the UE.

Optionally, the preset digital signature private key in the key management system 11 is a private key corresponding to an IBC ID of the KMS, or a private key corresponding to a digital certificate of the KMS.

In the foregoing embodiment, when the KMS needs to allocate the PVT and the SSK to the UE, the KMS cannot learn about identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace a real identity of the UE based on the PVT included in a message signed by the UE by using the (PVT, SSK), thereby achieving high security.

Figure 12:
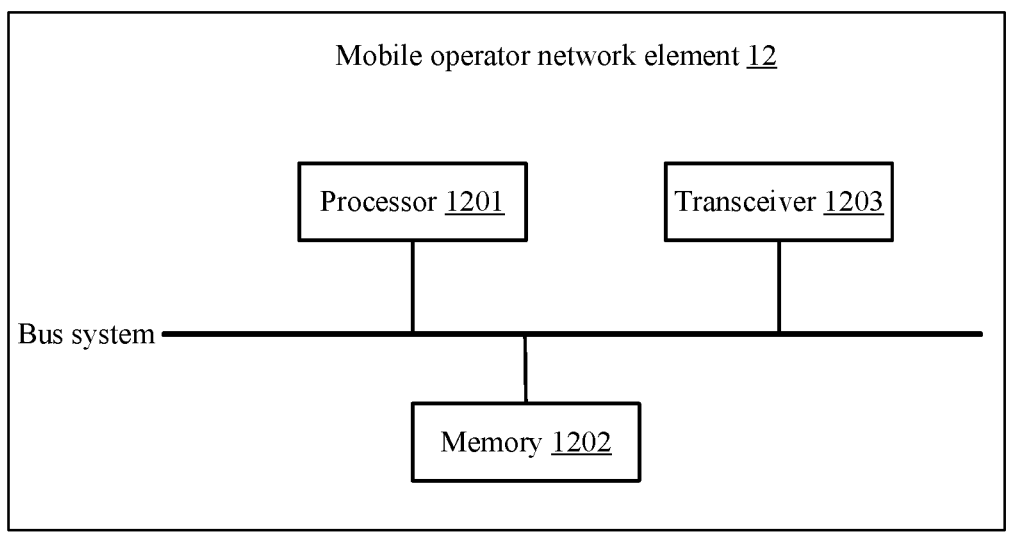
FIG. 12 is another schematic structural diagram of a key management system according to an embodiment of the present invention.

FIG. 12 is a schematic structural diagram of a key management system according to an embodiment of the present invention. In this embodiment of the present invention, the key management system 12 includes: a processor 1201, a memory 1202, and a transceiver 1203. The transceiver 1203 is configured to send data to or receive data from an external device. There may be one or more processors 1201 in the key management system 12. In some embodiments of the present invention, the processor 1201, the memory 1202, and the transceiver 1203 may be connected by using a bus system or in another manner. The key management system 12 may be configured to perform the methods shown in FIG. 2 to FIG. 6. For meanings of terms and examples that are included in this embodiment, refer to the embodiments corresponding to FIG. 2 to FIG. 6. Details are not described herein again.

The memory 1202 stores program code. The processor 1201 is configured to invoke the program code stored in the memory 1202, to perform the following operations:

receiving a key request sent by a mobile operator network element MON, where the key request carries a public key of UE;

allocating, to the UE, at least one PVT and one secret signing key SSK used for signing that are based on identity-based cryptography IBC;

encrypting the at least one PVT and the one SSK based on the public key of the UE to generate ciphertext;

signing a to-be-signed object based on a preset digital signature private key to generate a digital signature, where the to-be-signed object includes the public key of the UE and the ciphertext;

determining a signature validation public key associated with the digital signature private key; and returning a key response to the MON, where the key response carries the signature validation private key, the public key of the UE, the ciphertext, and the digital signature.

Optionally, the processor 1201 is further configured to:

bind the public key of the UE to the at least one PVT, and store the public key of the UE and the at least one PVT.

Optionally, the processor 1201 is further configured to:

send a storage request to an associated key management network element, where the storage request carries the public key of the UE and the at least one PVT, and the storage request is used to instruct the key management network element to: bind the public key of the UE to the at least one PVT, and store the public key of the UE and the at least one PVT.

Optionally, the processor 1201 is further configured to:

receive an identity query request sent by an MDM, where the identity query request carries the PVT of the UE;

query for the public key of the UE associated with the PVT of the UE; and return an identity query response to the MDM, where the identity query response carries the public key of the UE.

Optionally, the preset digital signature private key is a private key corresponding to an IBC ID of the KMS, or a private key corresponding to a digital certificate of the KMS.

In the foregoing embodiment, when the KMS needs to allocate the PVT and the SSK to the UE, the KMS cannot learn about identity information of the UE. After encrypting the allocated PVT and SSK, the KMS forwards an encrypted PVT and SSK to the UE by using the MNO. The MNO cannot learn about the PVT and the SSK allocated to the UE. In this way, both the MNO and the KMS participating in key allocation for the UE cannot trace a real identity of the UE based on the PVT included in a message signed by the UE by using the (PVT, SSK), thereby achieving high security.

Figure 13:
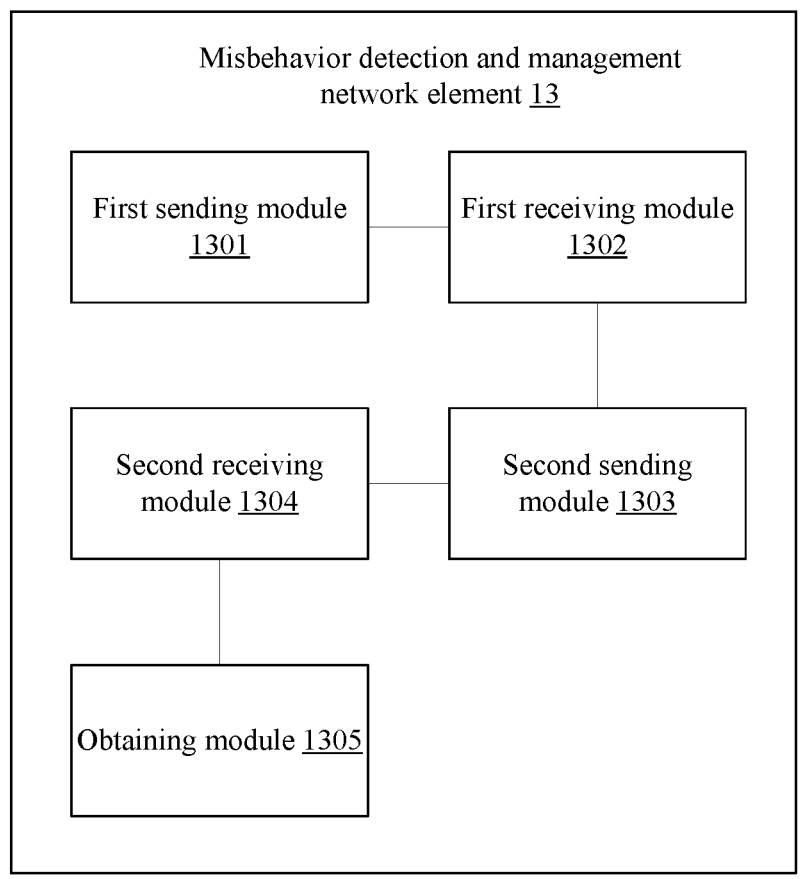
FIG. 13 is a schematic structural diagram of a misbehavior detection and management network element according to an embodiment of the present invention.

FIG. 13 is a schematic structural diagram of a misbehavior detection and management network element according to an embodiment of the present invention. For terms and processes included in this embodiment of the present invention, refer to descriptions in the embodiments of FIG. 4 and FIG. 6. The misbehavior detection and management network element 13 includes: a first sending module 1301, a first receiving module 1302, a second sending module 1303, a second receiving module 1304, and an obtaining module 1305.

The first sending module 1301 is configured to send a first identity query request to a second network element, where the first identity query request carries a PVT of UE.

The first receiving module 1302 is configured to receive a first identity query response returned by the second network element based on the first identity query request, where the first identity query response carries a public key associated with the PVT of the UE.

The second sending module 1303 is configured to send a second identity query request to a first network element based on the public key of the UE.

The second receiving module 1304 is configured to receive a second identity query response returned by the second network element based on the second identity query request, where the second identity query response carries identity information of the UE.

The obtaining module 1305 is configured to: receive the second identity query response, and obtain the identity information of the UE.

Optionally, the first network element is a mobile operator network element MNO, and the second network element is a key management system KMS.

Optionally, the first network element is a network element associated with an MNO and independent of the MNO, and the second network element is a network element associated with the KMS and independent of the KMS.

In the foregoing embodiment, when the MDM needs to query for a real network identity of the UE corresponding to the PVT, the MDM needs to obtain the public key of the UE from the KMS or a second key management network element, and then obtain the identity information of the UE from the MNO or a first key management network element based on the obtained public key of the UE. This implements tracing of the real identity of the UE based on the anonymous PVT.

Figure 14:
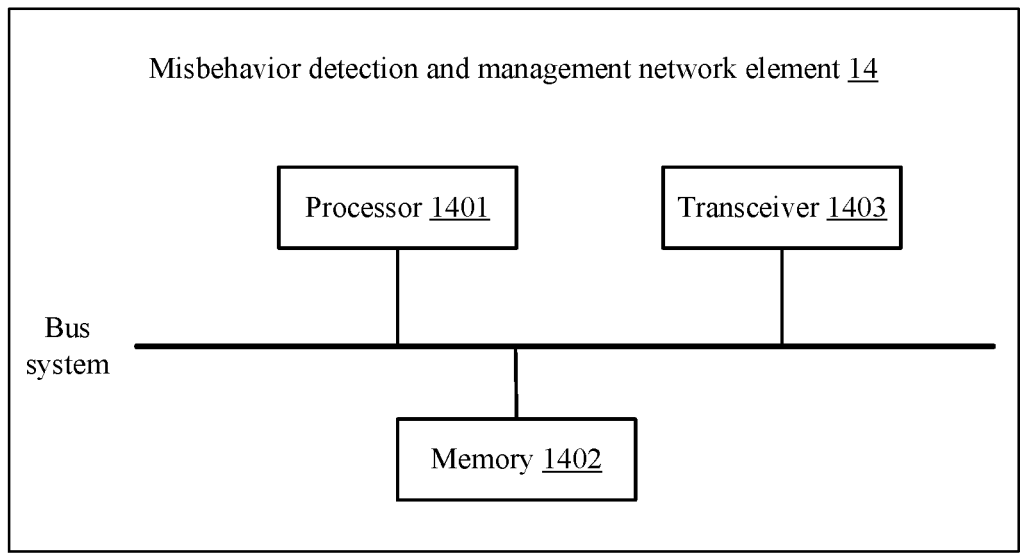
FIG. 14 is another schematic structural diagram of a misbehavior detection and management network element according to an embodiment of the present invention.

FIG. 14 is a schematic structural diagram of a misbehavior detection and management network element according to an embodiment of the present invention. In this embodiment of the present invention, the misbehavior detection and management network element 14 includes: a processor 1401, a memory 1402, and a transceiver 1403. The transceiver 1403 is configured to send data to or receive data from an external device. There may be one or more processors 1401 in the misbehavior detection and management network element 14. In some embodiments of the present invention, the processor 1401, the memory 1402, and the transceiver 1403 may be connected by using a bus system or in another manner. The misbehavior detection and management network element 14 may be configured to perform the methods shown in FIG. 4 and FIG. 6. For meanings of terms and examples that are included in this embodiment, refer to the embodiments corresponding to FIG. 4 and FIG. 6. Details are not described herein again.

The memory 1402 stores program code. The processor 1401 is configured to invoke the program code stored in the memory 1402, to perform the following operations:

sending a first identity query request to a second network element, where the first identity query request carries a PVT of UE;

receiving a first identity query response returned by the second network element based on the first identity query request, where the first identity query response carries a public key associated with the PVT of the UE;

sending a second identity query request to a first network element based on the public key of the UE;

receiving a second identity query response returned by the second network element based on the second identity query request, where the second identity query response carries identity information of the UE; and receiving the second identity query response, and obtaining the identity information of the UE.

Optionally, the first network element is a mobile operator network element MNO, and the second network element is a key management system KMS.

Optionally, the first network element is a network element associated with an MNO and independent of the MNO, and the second network element is a network element associated with the KMS and independent of the KMS.

In the foregoing embodiment, when the MDM needs to query for a real network identity of the UE corresponding to the PVT, the MDM needs to obtain the public key of the UE from the KMS or a second key management network element, and then obtain the identity information of the UE from the MNO or a first key management network element based on the obtained public key of the UE. This implements tracing of the real identity of the UE based on the anonymous PVT.

A person of ordinary skill in the art may understand that all or some of the processes of the methods in the embodiments may be implemented by a computer program by instructing relevant hardware. The program may be stored in a computer readable storage medium. When the program runs, the processes of the methods in the embodiments are performed. The storage medium may be a magnetic disc, an optical disc, a read-only memory (Read-Only Memory, ROM), a random access memory (Random Access Memory, RAM), or the like.

What are disclosed above are merely preferred embodiments of the present invention, and certainly are not intended to limit the protection scope of the present invention. Therefore, equivalent variations made in accordance with the claims of the present invention shall fall within the scope of the present invention.

What is claimed is:

1. A key distribution system, comprising: user equipment (UE), a mobile network operator network element (MNO), and a key management system (KMS), wherein
the UE is configured to: generate a public key and a private key, the public key and the private key being associated with each other, and send a first key request to the MNO, wherein the first key request carries the public key of the UE;
the MNO comprising a hardware processor configured to: receive the first key request, obtain the public key of the UE carried in the first key request, generate a second key request based on the public key of the UE, and send the second key request to the KMS, wherein the second key request carries the public key of the UE;
the KMS comprising a hardware processor configured to: receive the second key request; obtain the public key of the UE carried in the second key request; allocate, to the UE, at least one public validation token PVT and one secret signing key SSK used for signing that are based on identity-based cryptography IBC; encrypt the at least one PVT and the one SSK based on the public key of the UE to obtain ciphertext; sign a to-be-signed object based on a preset digital signature private key to obtain a digital signature; determine a signature validation public key associated with the digital signature private key; and send, to the MNO, a key response carrying the signature validation public key, the public key of the UE, the ciphertext, and the digital signature, wherein the to-be-signed object comprises the public key of the UE and the ciphertext;

the MNO is further configured to: receive the key response, and return the key response to the UE; and the UE is further configured to: receive the key response; obtain the signature validation public key, the public key of the UE, the digital signature, and the ciphertext that are carried in the key response; verify the digital signature based on the signature validation public key; and after the validation succeeds, decrypt the ciphertext based on the private key associated with the public key of the UE to obtain the at least one PVT and the one SSK, and store the at least one PVT and the one SSK.

2. The system according to claim 1, wherein the first key request further carries identity information of the UE;

the MNO is further configured to: obtain the identity information of the UE carried in the first key request, bind the public key of the UE to the identity information of the UE, and store the public key of the UE and the identity information of the UE; and the KMS is further configured to: bind the public key of the UE to the at least one PVT, and store the public key of the UE and the at least one PVT.

3. The system according to claim 2, further comprising: a misbehavior detection and management network element (MDM), wherein the MDM comprising a hardware processor configured to send a first identity query request to the KMS, wherein the first identity query request carries the PVT of the UE;

the KMS is further configured to: receive the first identity query request, obtain the PVT of the UE carried in the first identity query request, query for the public key of the UE associated with the PVT of the UE, and return, to the MDM, a first identity query response carrying the public key of the UE;

the MDM is further configured to: receive the first identity query response, obtain the public key of the UE carried in the first identity query response, generate a second identity query request based on the public key of the UE, and send the second identity query request to the MNO, wherein the second identity query request carries the public key of the UE;

the MNO is further configured to: receive the second identity query request, obtain the public key of the UE carried in the second identity query request, query for the identity information of the UE associated with the public key of the UE, and return, to the MDM, a second identity query response carrying the identity information of the UE; and the MDM receives the second identity query response, and obtains the identity information of the UE carried in the second identity query response.

4. The system according to claim 1, wherein the system further comprises: a first key management network element and a second key management network element, wherein the MNO is further configured to: obtain identity information of the UE, and send a first storage request to the first key management network element, wherein the first storage request carries the public key of the UE and the identity information of the UE;

the first key management network element comprising a hardware processor configured to: receive the first storage request, obtain the public key of the UE and the identity information of the UE that are carried in the first storage request, bind the public key of the UE to the identity information of the UE, and store the public key of the UE and the identity information of the UE;

the KMS is further configured to send a second storage request to the second key management network element, wherein the second storage request carries the public key of the UE and the at least one PVT; and the second key management network element comprising hardware a processor configured to: receive the second storage request, obtain the public key of the UE and the at least one PVT that are carried in the second storage request, bind the public key of the UE to the at least one PVT, and store the public key of the UE and the at least one PVT.

5. The system according to claim 3, wherein the system further comprises the MDM, wherein the MDM is configured to send a first identity query request to the second key management network element, wherein the first identity query request carries the PVT of the UE;

the second key management network element is further configured to: receive the first identity query request, obtain the PVT of the UE carried in the first identity query request, query for the public key of the UE associated with the to-be-processed PVT, and return, to the MDM, a first identity query response carrying the public key of the UE;

the MDM is further configured to: receive the first identity query response, obtain the public key of the UE carried in the first identity query response, generate a second identity query request based on the public key of the UE, and send the second identity query request to the first key management network element, wherein the second identity query request carries the public key of the UE;

the first key management network element is further configured to: receive the second identity query request, obtain the public key of the UE carried in the second identity query request, query for the identity information of the UE associated with the public key of the UE, and return, to the MDM, a second identity query response carrying the identity information of the UE; and the MDM is further configured to receive the second identity query response, and obtain the identity information of the UE carried in the second identity query response.

6. The system according to claim 1, wherein identity information of the UE comprises an international mobile subscriber identity (IMSI) of the UE or a PKI-based digital certificate of the UE.

7. The system according to claim 1, wherein the preset digital signature private key is a private key corresponding to an IBC ID of the KMS, or a private key corresponding to a digital certificate of the KMS.

8. A key obtaining method, comprising:
generating, by user equipment (UE), a public key and a private key that have an association relationship;
sending, by the UE, a first key request to a mobile operator network element (MNO), wherein the key request carries the public key of the UE;
receiving, by the MNO, the first key request;
obtaining, by the MNO, the public key of the UE carried in the first key request;
generating, by the MNO, a second key request based on the public key of the UE, sending, by the MNO, the second key request to the key management system (KMS), wherein the second key request carries the public key of the UE;

at the KMS, performing: receiving the second key request; obtaining the public key of the UE carried in the second key request; allocating, to the UE, at least one public validation token PVT and one secret signing key SSK used for signing that are based on identity-based cryptography IBC; encrypting the at least one PVT and the one SSK based on the public key of the UE to obtain ciphertext; signing a to-be-signed object based on a preset digital signature private key to obtain a digital signature; determine a signature validation public key associated with the digital signature private key; and sending, to the MNO, a key response carrying the signature validation public key, the public key of the UE, the ciphertext, and the digital signature, wherein the to-be-signed object comprises the public key of the UE and the ciphertext receiving, by the UE, a key response returned by the MNO, wherein the key response carries a signature validation public key, the public key of the UE, ciphertext, and a digital signature; and verifying, by the UE, the digital signature based on the signature validation public key;

after the validation succeeds, obtaining, by the UE, the private key associated with the public key of the UE;

decrypting, by the UE, the ciphertext based on the private key of the UE to obtain at least one PVT and one secret signing key SSK used for signing that are based on identity-based cryptography IBC; and storing, by the UE, the at least one PVT and the one SSK.

9. The method according to claim 8, wherein identity information of the UE comprises an IMSI of the UE or a digital certificate of the UE.

10. The method according to claim 8, wherein the signature validation public key is an IBC ID or a PVT of a KMS, or a digital certificate of the KMS.

\* \* \* \* \*